(12) United States Patent
Bhatt

(10) Patent No.: US 12,139,892 B1
(45) Date of Patent: Nov. 12, 2024

(54) LIQUID DIVERSION APPARATUS

(71) Applicant: Bessel, LLC, Roswell, GA (US)

(72) Inventor: Divesh Bhatt, Roswell, GA (US)

(73) Assignee: Bessel, LLC, Roswell, GA (US)

( * ) Notice: Subject to any disclaimer, the term of this patent is extended or adjusted under 35 U.S.C. 154(b) by 601 days.

(21) Appl. No.: 17/368,784

(22) Filed: Jul. 6, 2021

Related U.S. Application Data

(60) Provisional application No. 63/048,224, filed on Jul. 6, 2020.

(51) Int. Cl.
*E03B 7/10* (2006.01)
*B01D 61/02* (2006.01)
(Continued)

(52) U.S. Cl.
CPC .............. *E03B 7/10* (2013.01); *B01D 61/026* (2022.08); *B01D 61/027* (2013.01);
(Continued)

(58) Field of Classification Search
CPC .... B01D 25/00; B01D 25/003; B01D 25/007; B01D 25/005; B01D 63/00; B01D 63/08; B01D 63/081; B01D 63/082; B01D 67/00; B01D 65/00; B01D 69/06; B01D 2221/00; B01D 2221/02; B01D 2221/06; B01D 2221/12; B01D 2265/00; B01D 2265/02; B01D 2265/04; B01D 2265/05; B01D 2265/06; B01D 2271/00; B01D 2271/02; B01D 2271/027; B01D 2311/14; B01D 2313/00; B01D 2313/02; B01D 2313/025; B01D 2313/041; B01D 2313/04; B01D 2313/08; B01D 2313/086; B01D 2313/12; B01D 2313/13; B01D 2313/131;
(Continued)

(56) References Cited

U.S. PATENT DOCUMENTS 2,711,994 A * 6/1955 Quinn ..................... C02F 1/505
                                                        210/205
2,807,505 A    9/1957 Weitzel
(Continued)

FOREIGN PATENT DOCUMENTS

CN    208975337 U    6/2019

*Primary Examiner* — Allison G Fitzsimmons
(74) *Attorney, Agent, or Firm* — BEKIARES ELIEZER LLP

(57) ABSTRACT

In once aspect, the present disclosure relates to a liquid diversion apparatus comprising: an attachment module comprising: an attachment module housing, a first connecting portion configured to connect to a portion of an apparatus configured to direct liquid, and a second connecting portion configured to connect a downstream portion of the attachment module housing to a receptacle module; a first sealing portion configured to seal a porous plate module and the attachment module; the porous plate module comprising: a first filtering portion, a second filtering portion configured to connect to the first filtering portion, and a third filtering portion configured to connect to the second filtering portion; a second sealing portion configured to seal the porous plate module and the receptacle module; and the receptacle module configured to perform the following: secure to the attachment module, and collect liquid diverted through the porous plate module.

20 Claims, 24 Drawing Sheets

(51) Int. Cl.
  *B01D 61/08* (2006.01)
  *B01D 61/12* (2006.01)
  *B01D 63/08* (2006.01)
  *B01D 69/02* (2006.01)
  *E03B 7/07* (2006.01)

(52) U.S. Cl.
  CPC ........... *B01D 61/081* (2022.08); *B01D 61/12* (2013.01); *B01D 63/082* (2013.01); *B01D 69/02* (2013.01); *E03B 7/074* (2013.01); *B01D 2313/041* (2022.08); *B01D 2313/06* (2013.01); *B01D 2325/38* (2013.01)

(58) Field of Classification Search
  CPC .......... B01D 2313/125; B01D 2313/19; B01D 2313/20; B01D 2313/201; B01D 2313/205; B01D 2313/32; B01D 2313/54; B01D 2325/00; B01D 2325/38; Y10T 403/00; Y10T 403/57; Y10T 403/55; Y10T 137/2557; Y10T 137/2829; Y10T 137/5497; E03C 1/08; E03C 1/084; E03C 1/086; E03C 2001/026; E03C 2201/40; F16K 27/00; F16K 27/12; F16K 39/00; F16K 47/00; F16L 11/00; F16L 11/005; F16L 11/02; F16L 15/00; F16L 31/00; F16L 33/00; F16L 35/00; F16L 35/005; F16L 37/00; F16L 37/28; F16L 37/38; F16L 37/46; F16L 37/48; F16L 55/00; F16L 55/07; F16L 55/10; F16L 55/1007; F16L 55/1003; F16L 55/1011; F16L 55/1015; F16L 55/103; F16L 55/105; F16L 55/16; F16L 55/162; F16L 55/168; F16L 59/00; F16L 59/02; F16L 59/04; F16L 59/06; F16L 59/08; F16L 59/10; F16L 59/103; F16L 59/106; F16L 59/12; F16L 59/11; F16L 59/121; F16L 59/123; F16L 59/124; F16L 59/13; F16L 59/14; F16L 59/141; F16L 59/143; F16L 59/145; F16L 59/147; F16L 59/153; F16L 59/021; F16L 2201/00; F16L 2201/30; F16L 2201/20; F16L 57/00; F16L 57/005; F16L 57/02; F16L 57/04; F16L 57/06; E03B 7/12; E03B 7/071; E03B 7/10
  See application file for complete search history.

(56) References Cited

U.S. PATENT DOCUMENTS

| | | |
|---|---|---|
| 3,326,230 A | 6/1967 | Frank |
| 5,368,235 A | 11/1994 | Drozdoff et al. |
| 2003/0005772 A1 | 1/2003 | Hegner et al. |
| 2011/0247952 A1 | 10/2011 | Hebach et al. |
| 2013/0206759 A1 | 8/2013 | Würz et al. |
| 2017/0368508 A1* | 12/2017 | Grossman .......... B01D 71/0212 |

* cited by examiner

LIQUID DIVERSION APPARATUS

RELATED APPLICATION

Under the provisions of 35 U.S.C. § 119(e), Applicant claims benefit of U.S. Provisional Application No. 63/048,224 filed on Jul. 6, 2020, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to Pipe Burst Prevention.

BACKGROUND

Freezing temperatures can damage pipes. For example, when liquid in pipes begins to freeze, the liquid expands, increasing pressure in the pipe that ultimately damages the pipe. One strategy drips water via a faucet or shower head, so the pressure does not build in the pipe, and the water circulates enough as to not freeze. This strategy is problematic because the strategy wastes water and may not be effective in preventing the freezing and damaging of the pipes. A device that substantially reduces pipe damage is desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In accordance with the purposes of the present disclosure, as embodied and broadly described herein, in one aspect, relates to a liquid diversion apparatus for diverting near-freezing liquid from a pipe preventing a burst.

In one aspect, the present disclosure relates to a liquid diversion apparatus comprising: an attachment module comprising: an attachment module housing, a first connecting portion configured to connect to a portion of an apparatus configured to direct liquid, and a second connecting portion configured to connect a downstream portion of the attachment module housing to a receptacle module; a first sealing portion configured to seal a porous plate module and the attachment module; the porous plate module comprising: a first filtering portion, a second filtering portion configured to connect to the first filtering portion, and a third filtering portion configured to connect to the second filtering portion; a second sealing portion configured to seal the porous plate module and the receptacle module; and the receptacle module configured to perform the following: secure to the attachment module, and collect liquid diverted through the porous plate module.

In another aspect, the present disclosure relates to a liquid diversion apparatus comprising: an attachment module comprising: an attachment module housing, a first connecting portion configured to connect to an external piping element, and a second connecting portion configured to connect to a portion of a porous plate module housing; a first sealing portion configured to seal the porous plate module and the attachment module; the porous plate module comprising: a first filtering portion comprising a first side and a second side, a second filtering portion configured to connect to the first side of the first filtering portion, a third filtering portion configured to connect to the second filtering portion, a fourth filtering portion configured to connect to the second side of the first filtering portion; a second sealing portion configured to seal the porous plate module and the receptacle module; and the receptacle module configured to perform the following: secure to the attachment module, and collect liquid passing through the porous plate module; and a securing means configured to secure the attachment module to the receptacle module.

In another aspect, the present disclosure relates to a method for diverting liquid into a liquid diversion apparatus, the method comprising: connecting a liquid diversion apparatus, via an attachment module, to an external piping element, the liquid diversion apparatus comprising: the attachment module, a porous plate module configured to direct liquid from the attachment module, into the receptacle module, upon the liquid reaching a pressure above a predetermined threshold, the porous plate module comprising a nanoporous hydrophobic membrane, and a receptacle module; allowing fluid communication between the liquid diversion apparatus and the external piping element; increasing the pressure of the liquid past the predetermined threshold; and diverting the liquid through the porous plate module, into the receptacle module.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
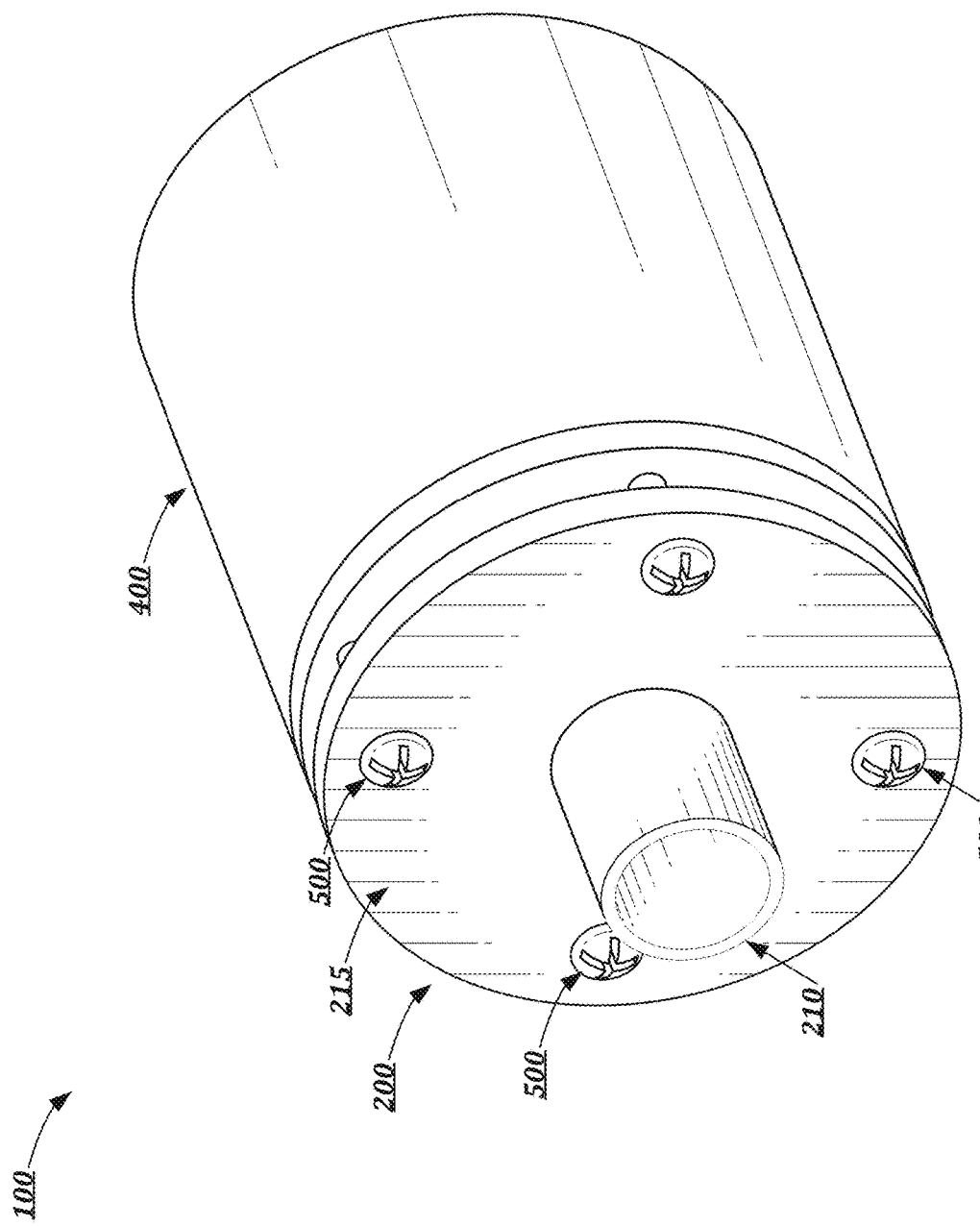
FIG. 1 illustrates a perspective view of a liquid diversion apparatus 100.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a liquid diversion apparatus and methods for using the same, embodiments of the present disclosure are not limited to use only in this context.

I. APPARATUS OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure provide a liquid diversion apparatus 100 comprised of a set of elements, including, but not limited to an attachment module 200, a porous plate module 300, a receptacle module 400, and an apparatus securing module 500. By way of nonlimiting example, the attachment module 200 may connect to the receptacle module 400. The attachment module 200 and receptacle module 400 may be used to house the porous plate module 300.

Embodiments of the present disclosure may comprise methods, systems, and components comprising, but not limited to, at least one of the following:
A. Attachment Module 200;
B. Porous Plate Module 300;
C. Receptacle Module 400;
D. Apparatus Securing Module 500; and In some embodiments, the present disclosure may provide an additional set of components for further facilitating the system. The additional set of components may comprise, but not be limited to:
E. A Liquid Directing Module 600.

Details with regards to each component is provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other. For example, all modules may be employed in the performance of some or all of the stages disclosed with regard to the methods. Similarly, one apparatus may be employed in the performance of some or all of the stages of the methods. As such, the apparatus may comprise at least one of the architectural components disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned components. The method may comprise one or more of the following stages:
  connecting a disclosed liquid diversion apparatus to a liquid directing apparatus;
  causing liquid within the liquid directing apparatus to move through a porous plate module upon reaching a liquid pressure threshold within the liquid directing apparatus, and
  collecting the liquid in a receptacle module.

In further aspects, the porous plate module can comprise a nanoporous hydrophobic membrane;

In still further aspects causing liquid within the liquid directing apparatus to move through a porous plate module can comprise diverting the liquid filtered through the porous plate module.

In yet further aspects, the method can further comprise:
  providing a first layer of a porous plate module;
  providing a second layer of a porous plate module,
    wherein the second layer of the porous plate module comprises a nanoporous hydrophobic membrane,
    wherein the second layer of the porous plate module connects to the first layer of the porous plate module;
  providing a third layer of porous plate module,
    wherein the third layer of the porous plate module connects to the second layer of the porous plate module;
  connecting the edges of the plurality of layers together; and
  connecting the plurality of layers to a housing of a liquid diversion apparatus.
  disconnecting an attachment module comprising a first gasket from a receptacle module comprising a second gasket;
  disconnecting the first gasket module from a used porous plate module;
  disconnecting the second gasket module from the used porous plate module;
  disconnecting the used porous plate module from a liquid diversion apparatus;
  connecting a new porous plate module to the liquid diversion apparatus;
  connecting the new porous plate module to the second gasket module;
  connecting the new porous plate module to the first gasket module; and
  connecting the attachment module to the receptacle module.
  providing an attachment module, a first gasket module, a porous plate module, a second gasket module, and a receptacle module;
  connecting a receptacle wall to a receptacle housing;
  connecting the second gasket module to a receptacle housing flange;
  connecting the porous plate module to the second gasket module, wherein the second gasket module is located between the receptacle housing flange and the porous plate module;

securing the first gasket module to the attachment module; and connecting the attachment module to the receptacle module, wherein the attachment module and receptacle module are connected by a first securing portion, wherein the first gasket module connects to the porous plate module.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. APPARATUS CONFIGURATION

Figure 2:
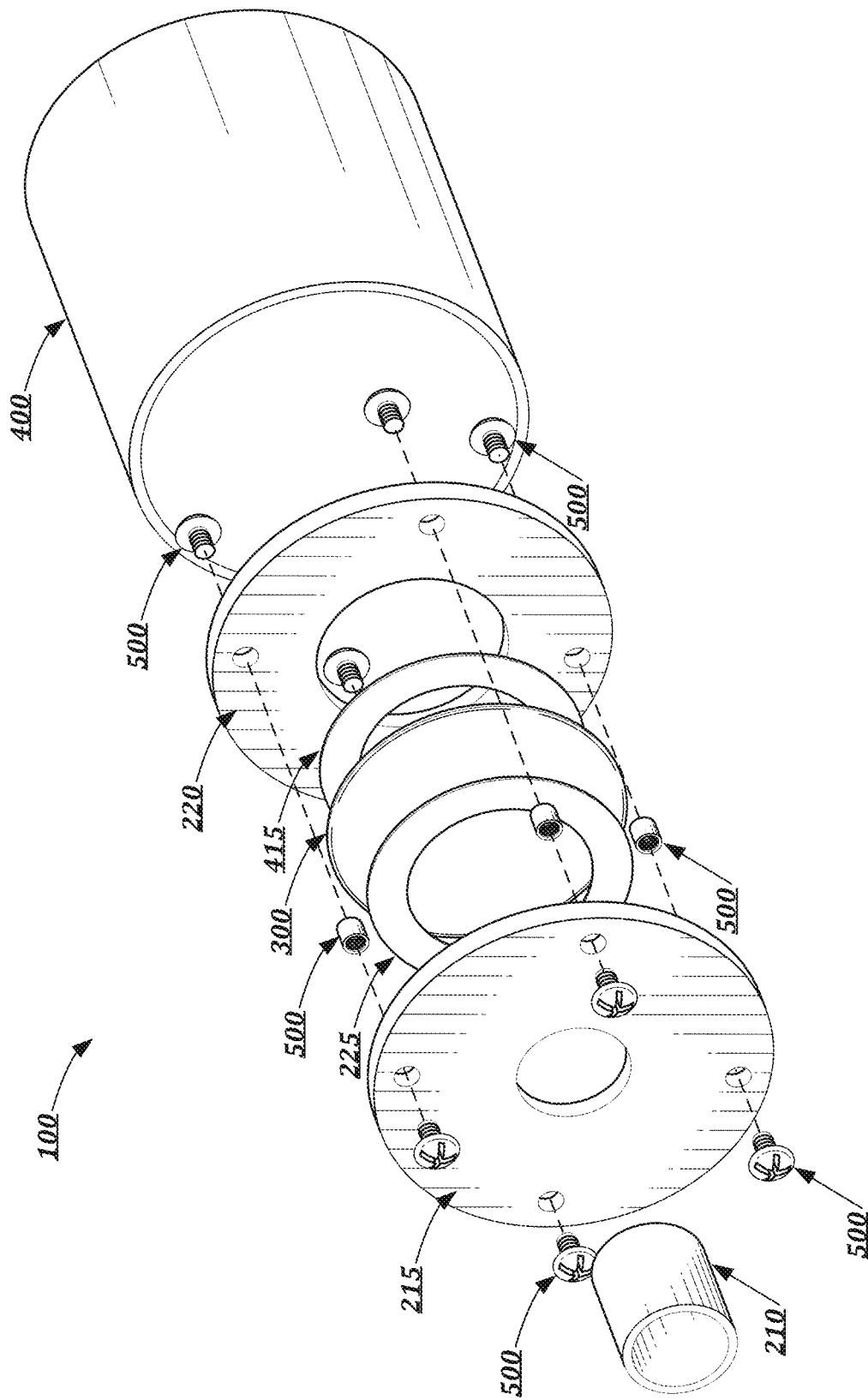
FIG. 2 illustrates an exploded perspective view thereof.
Figure 3:
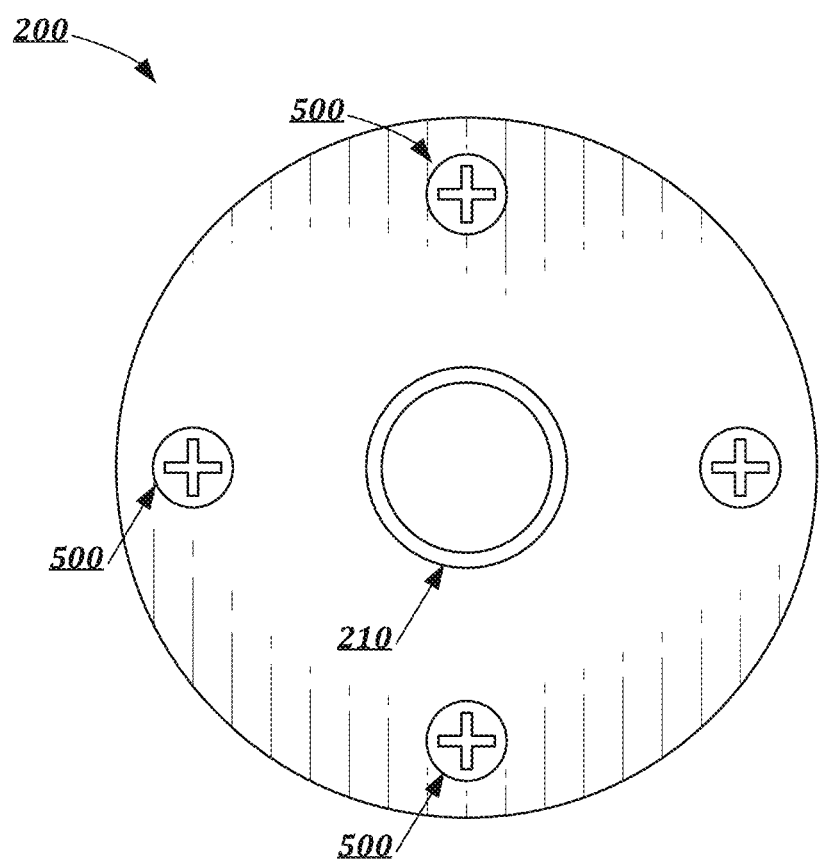
FIG. 3 illustrates a front view thereof.
Figure 4:
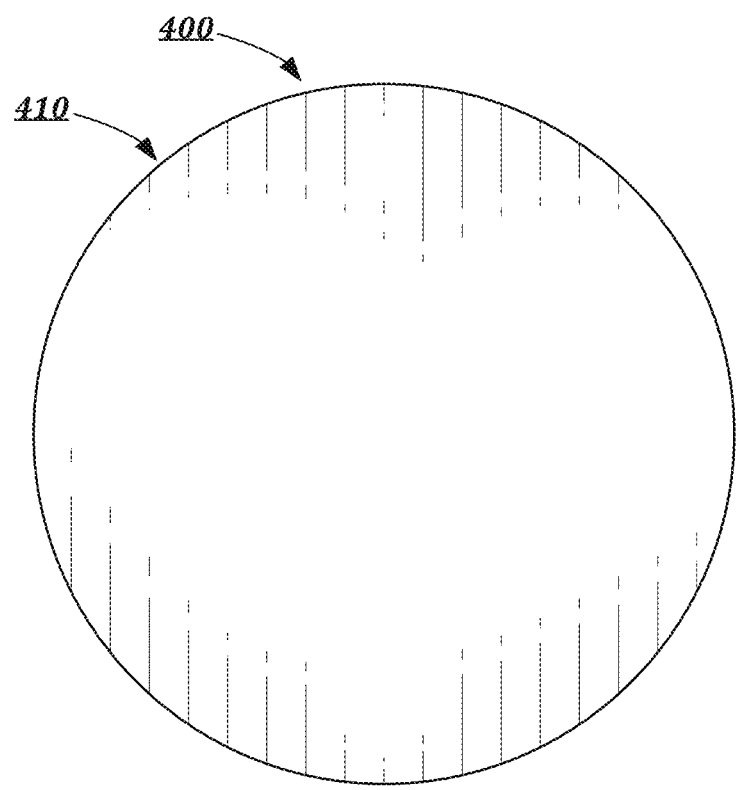
FIG. 4 illustrates a rear view thereof.
Figure 5:
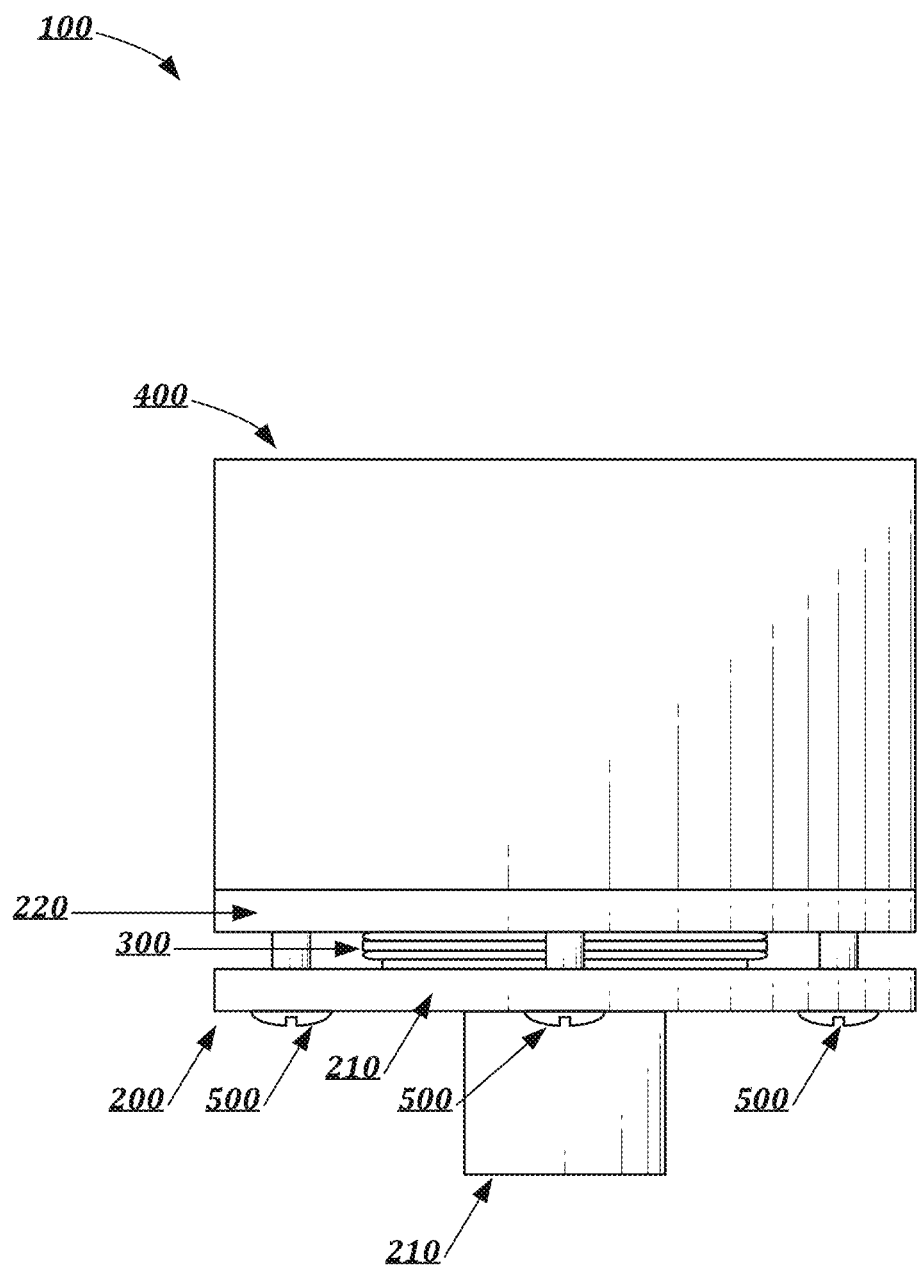
FIG. 5 illustrates a top view thereof.
Figure 6C:
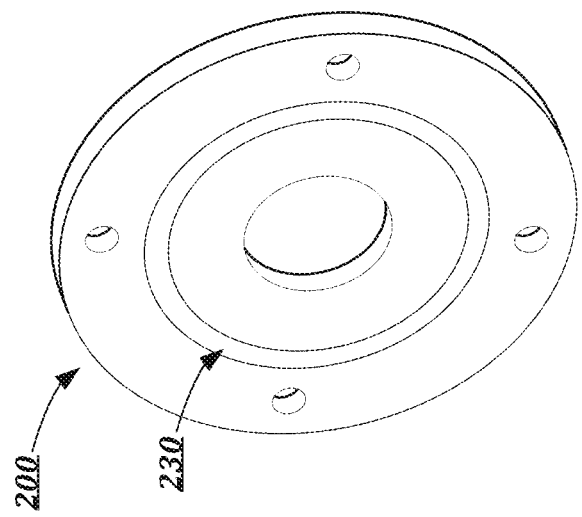
FIG. 6C illustrates a perspective rear view of an alternative embodiment of the attachment module 200.
Figure 6B:
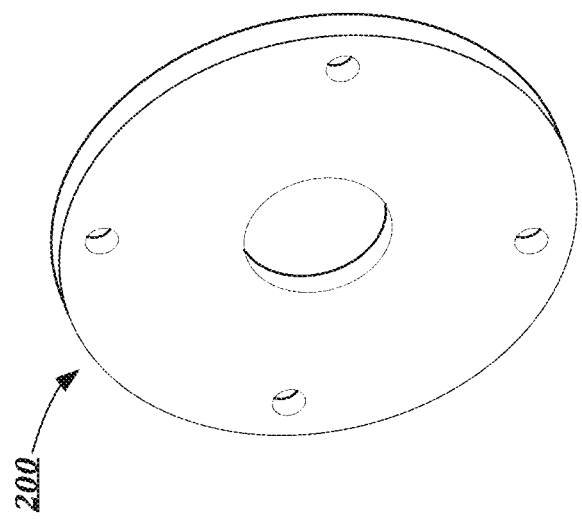
FIG. 6B illustrates a perspective rear view of the attachment module 200.
Figure 6A:
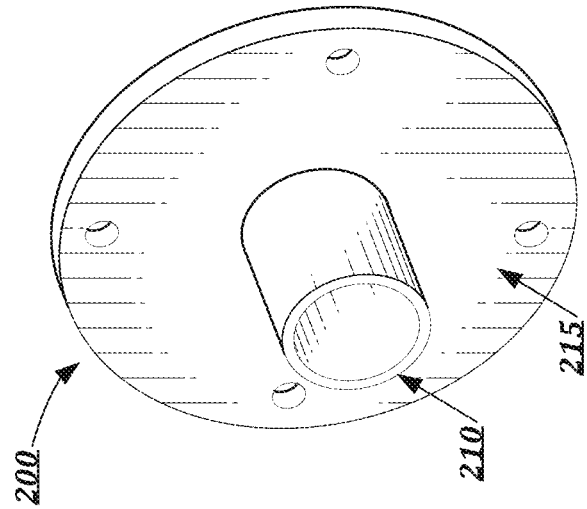
FIG. 6A illustrates perspective front view of an attachment module 200 of liquid diversion apparatus 100.
Figure 7:
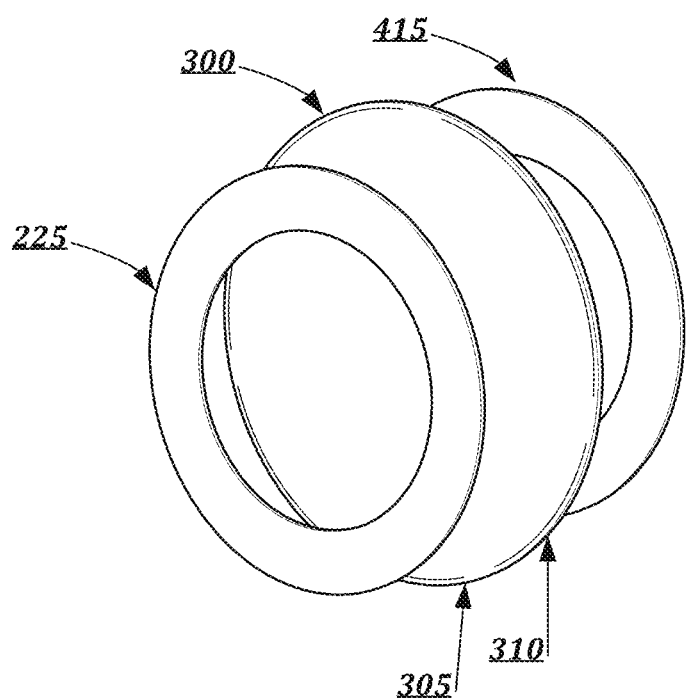
FIG. 7 illustrates a porous plate module 300.
Figure 8:
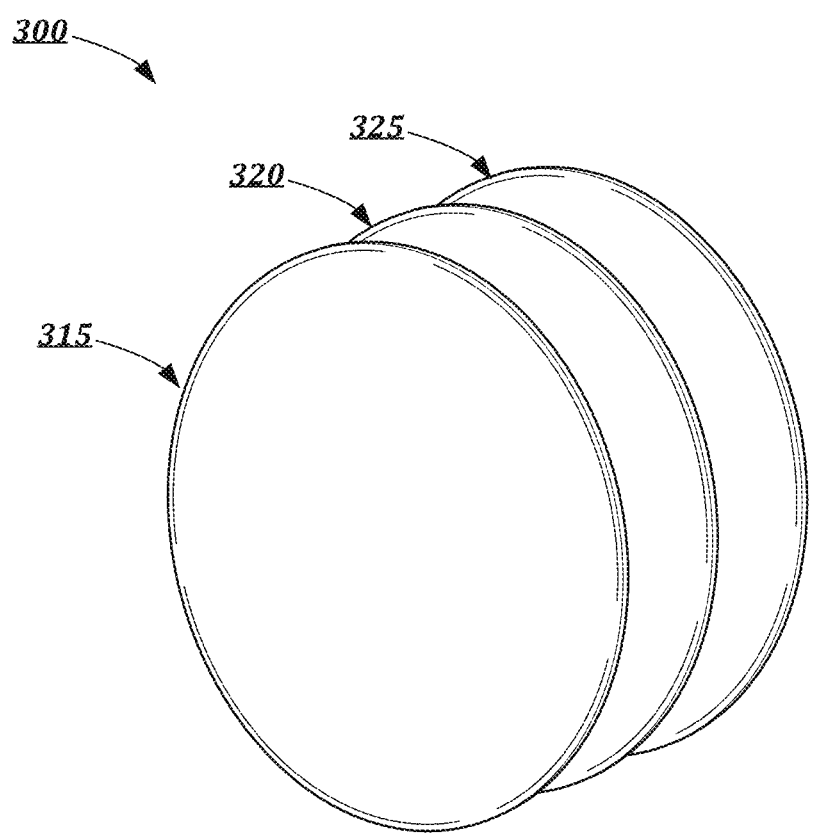
FIG. 8 illustrates at least a portion of the porous plate module 300.
Figure 9B:
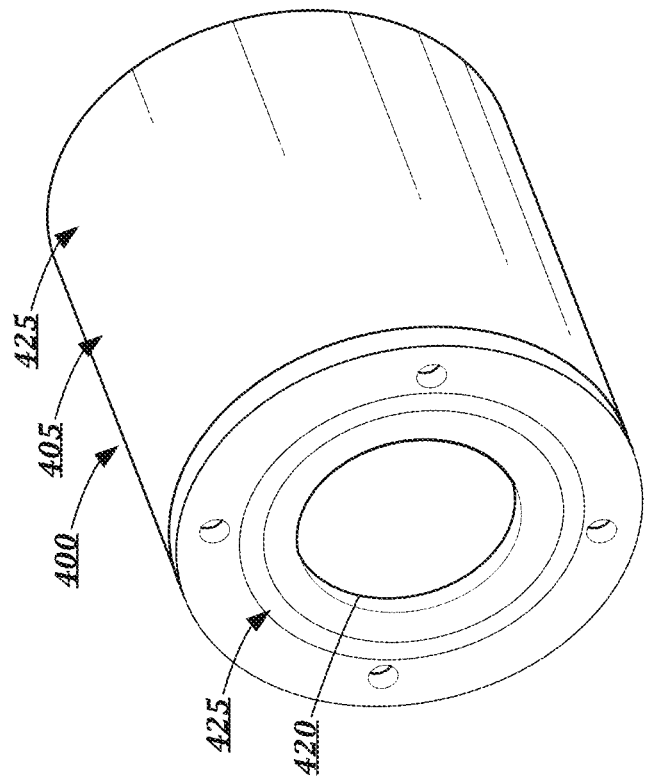
FIG. 9B illustrates an alternative embodiment of the receptacle module 400.
Figure 9A:
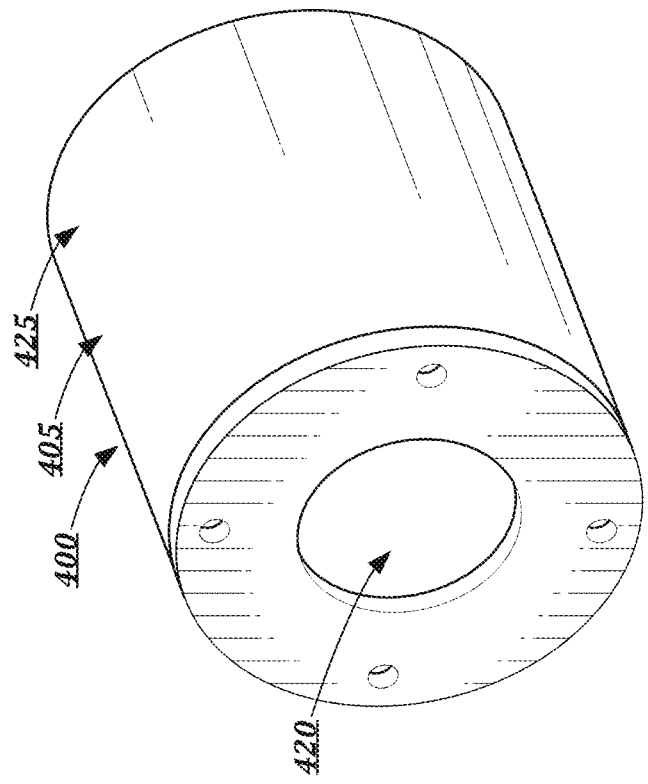
FIG. 9A illustrates a receptacle module 400 of liquid diversion apparatus 100.
Figure 10:
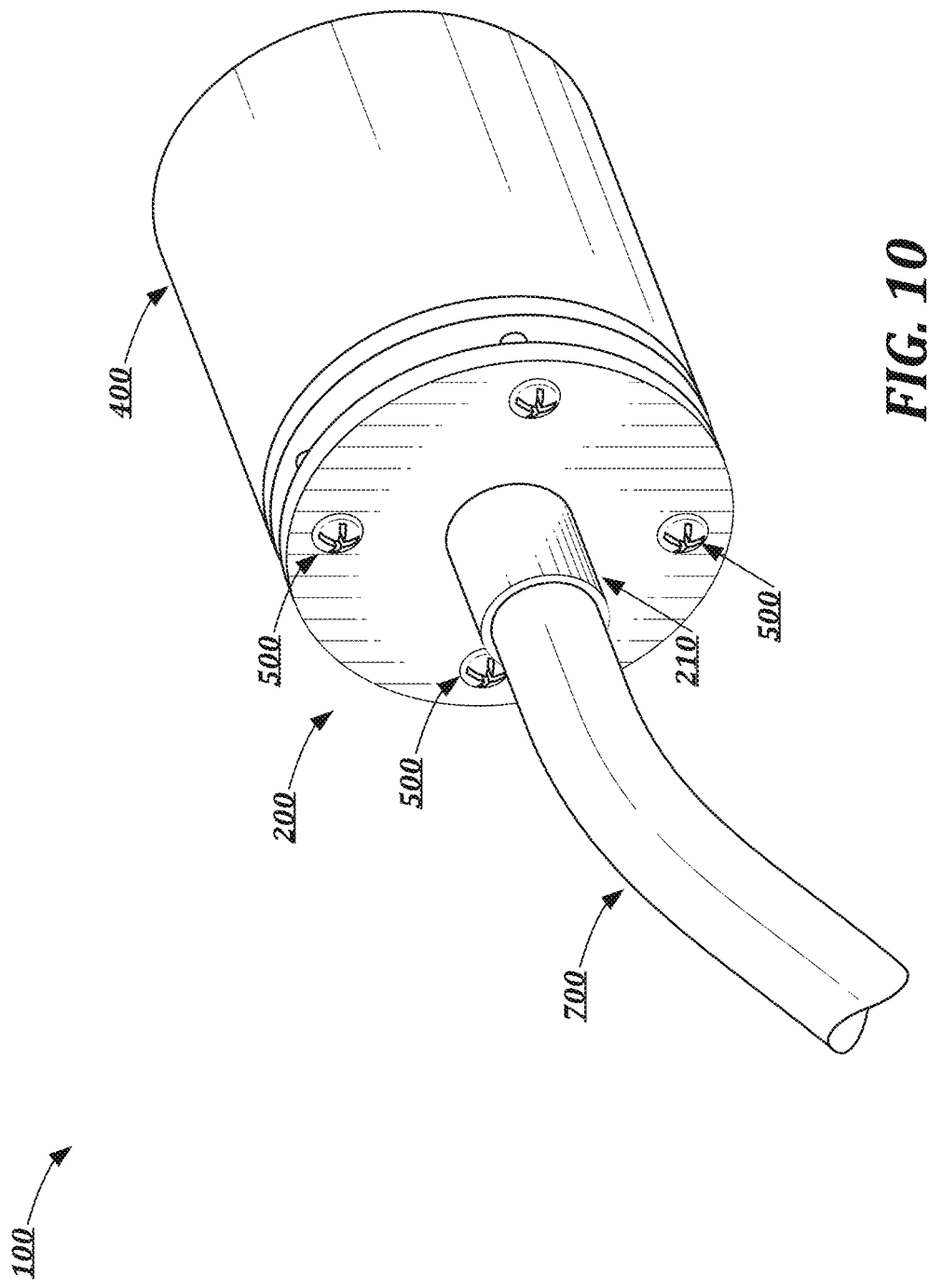
FIG. 10 illustrates a perspective view of the liquid diversion apparatus 100 attached to a piping element 700.
Figure 11:
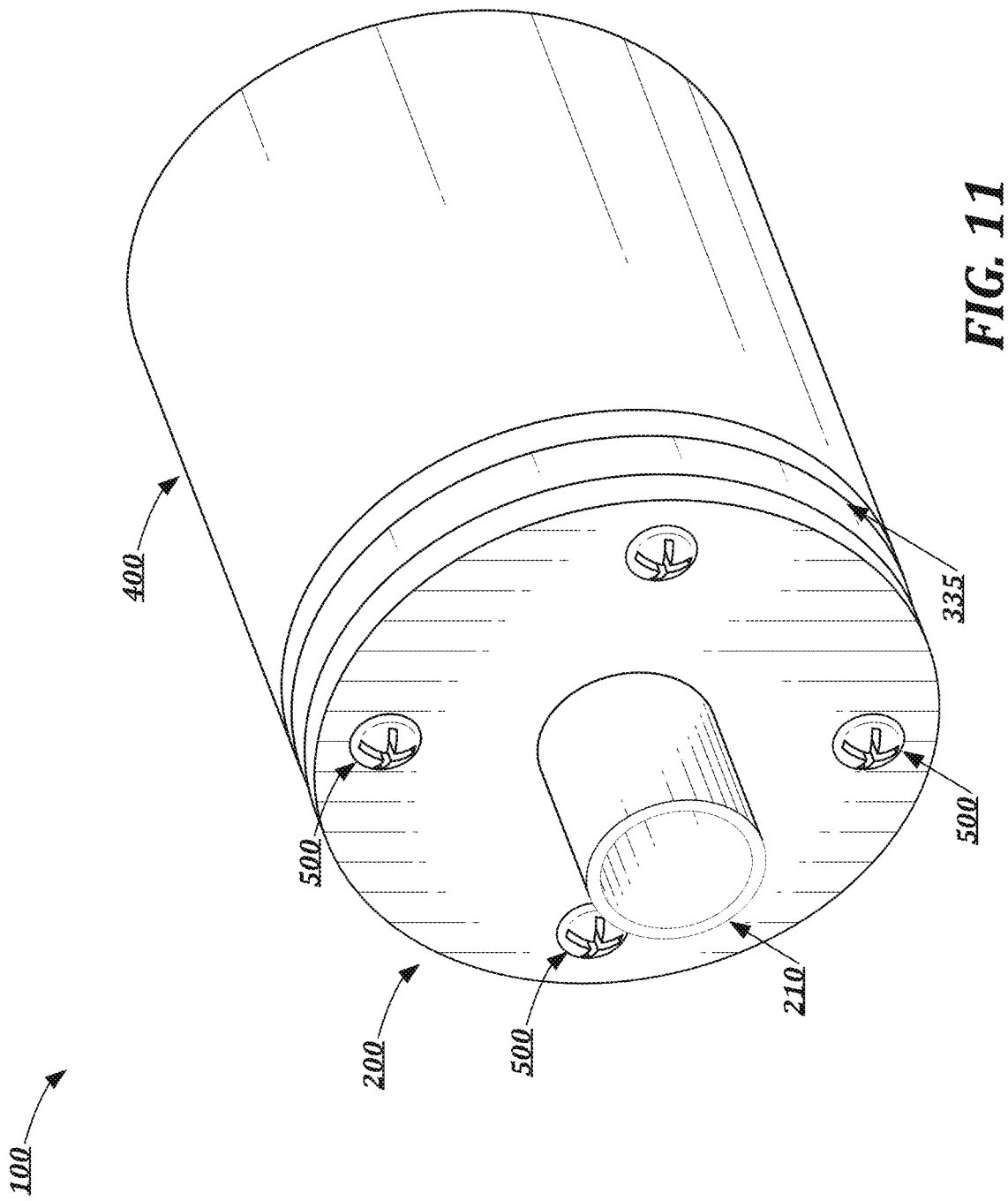
FIG. 11 illustrates a perspective view of an alternative embodiment of a liquid diversion apparatus 100.
Figure 12:
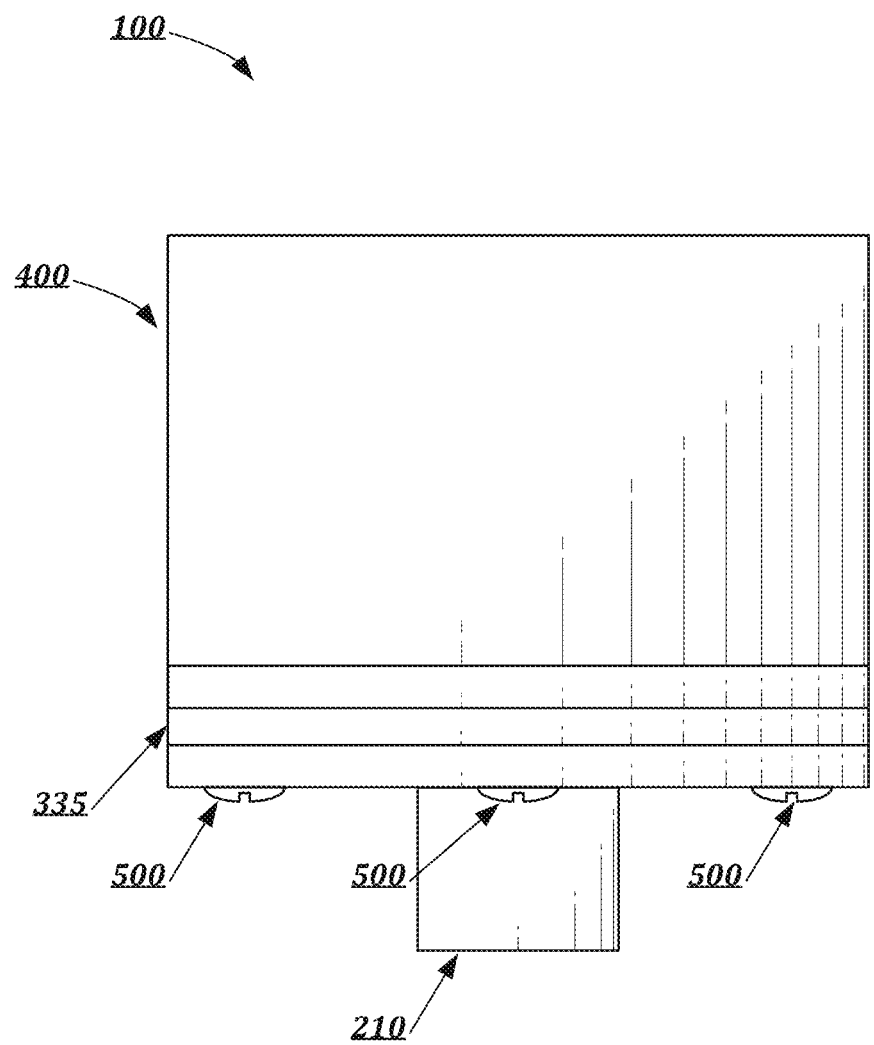
FIG. 12 illustrates a top view thereof.
Figure 13:
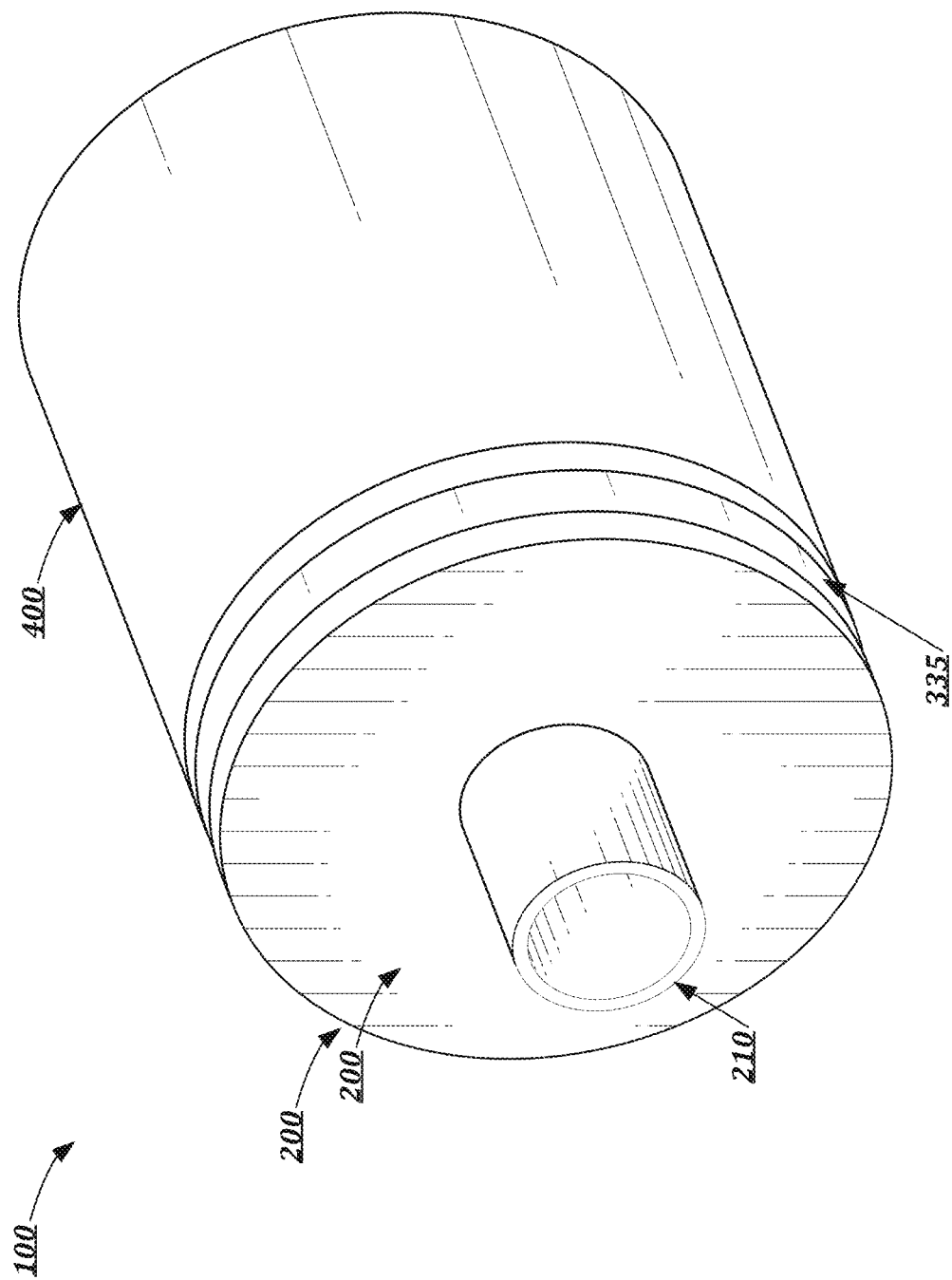
FIG. 13 illustrates a perspective view of an alternative embodiment of a liquid diversion apparatus 100.
Figure 14:
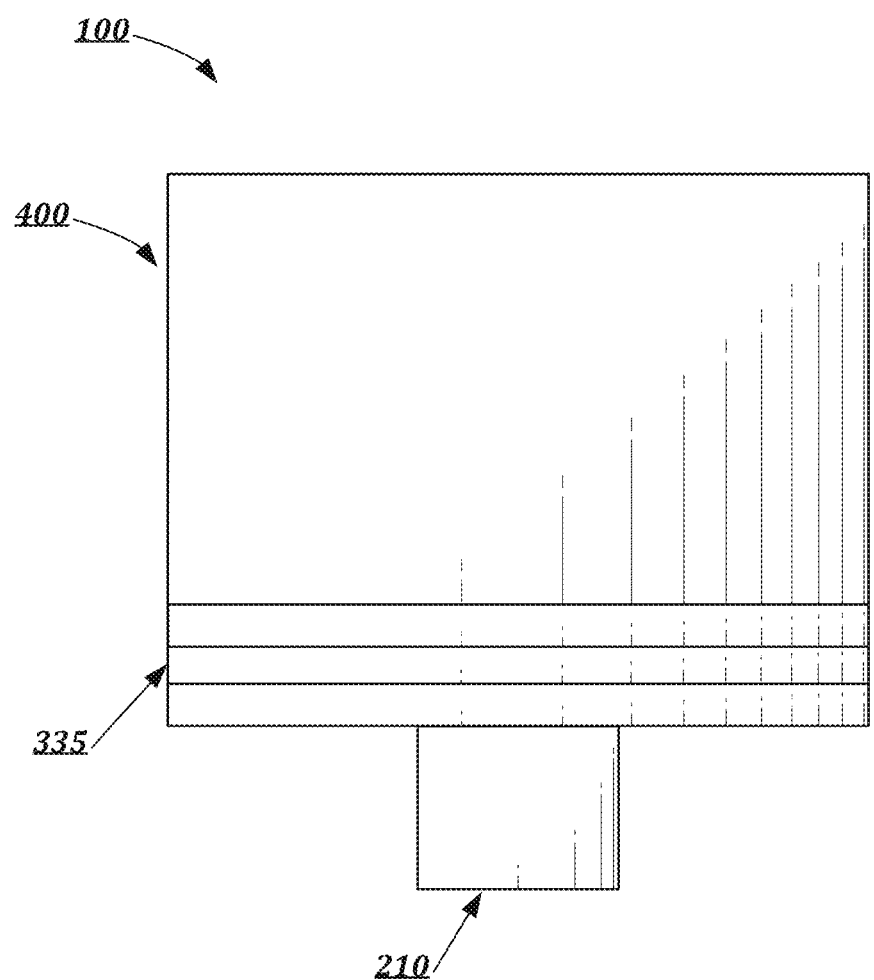
FIG. 14 illustrates a top view thereof.
Figure 15:
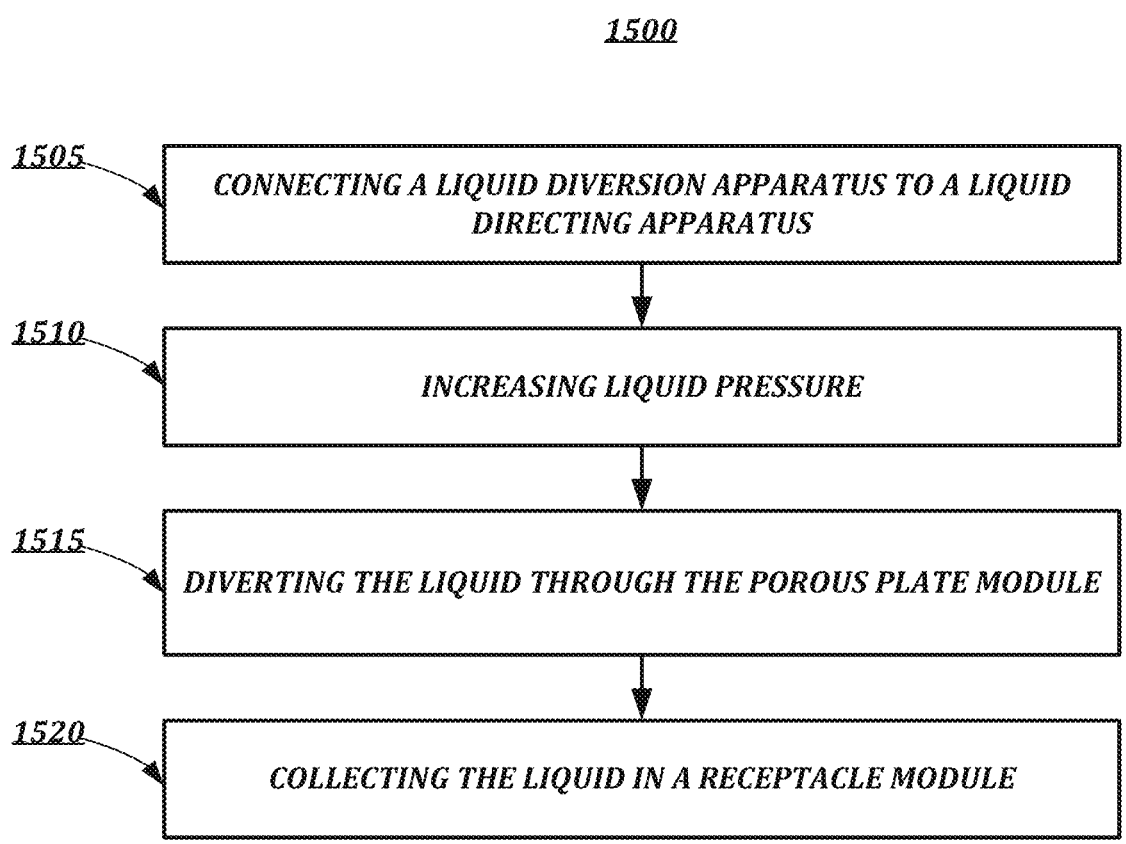
FIG. 15 is a flow chart illustrating a method 1500 for diverting liquid into the liquid diversion apparatus 100.
Figure 16:
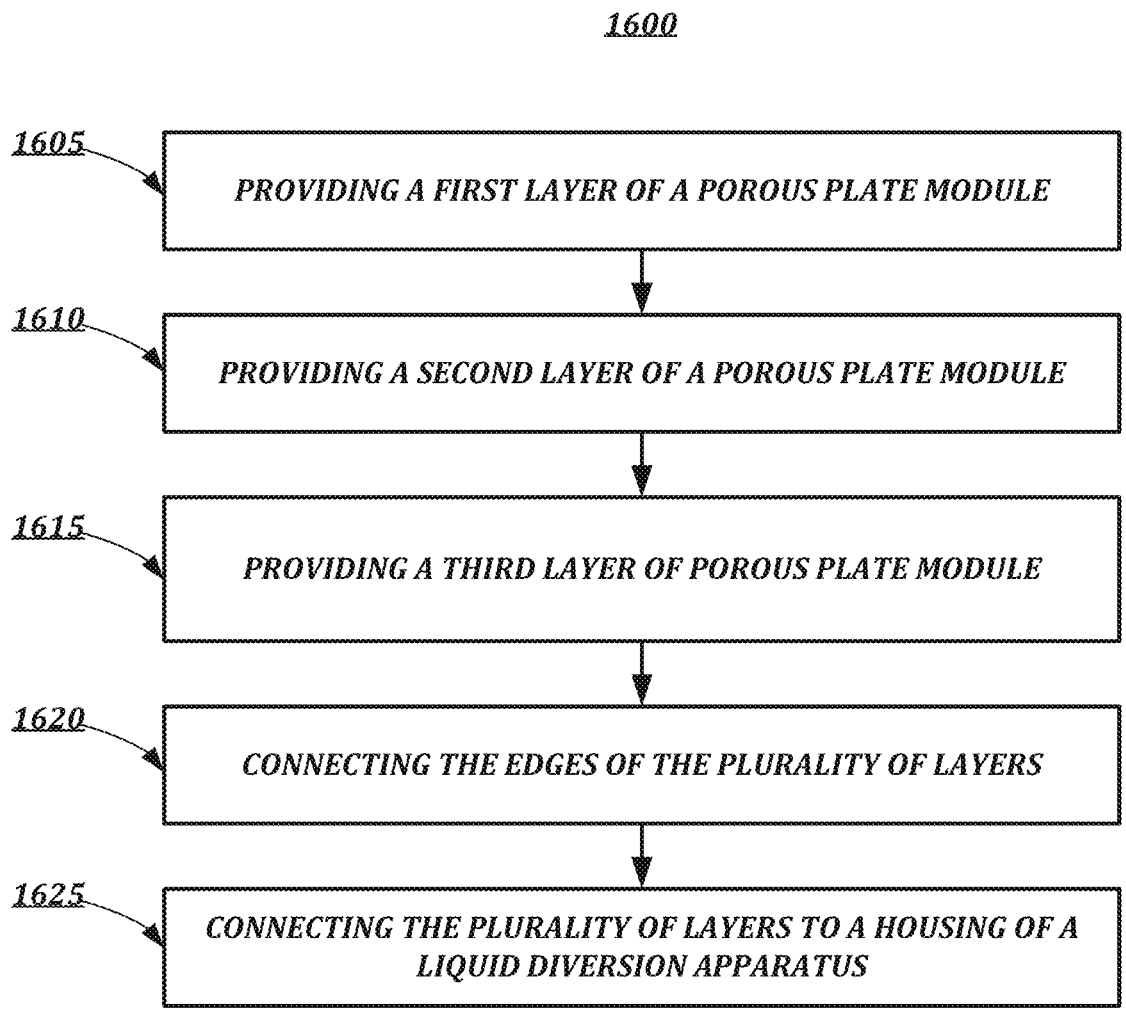
FIG. 16 is a flow chart illustrating a method 1600 for providing the porous plate module 300.
Figure 17:
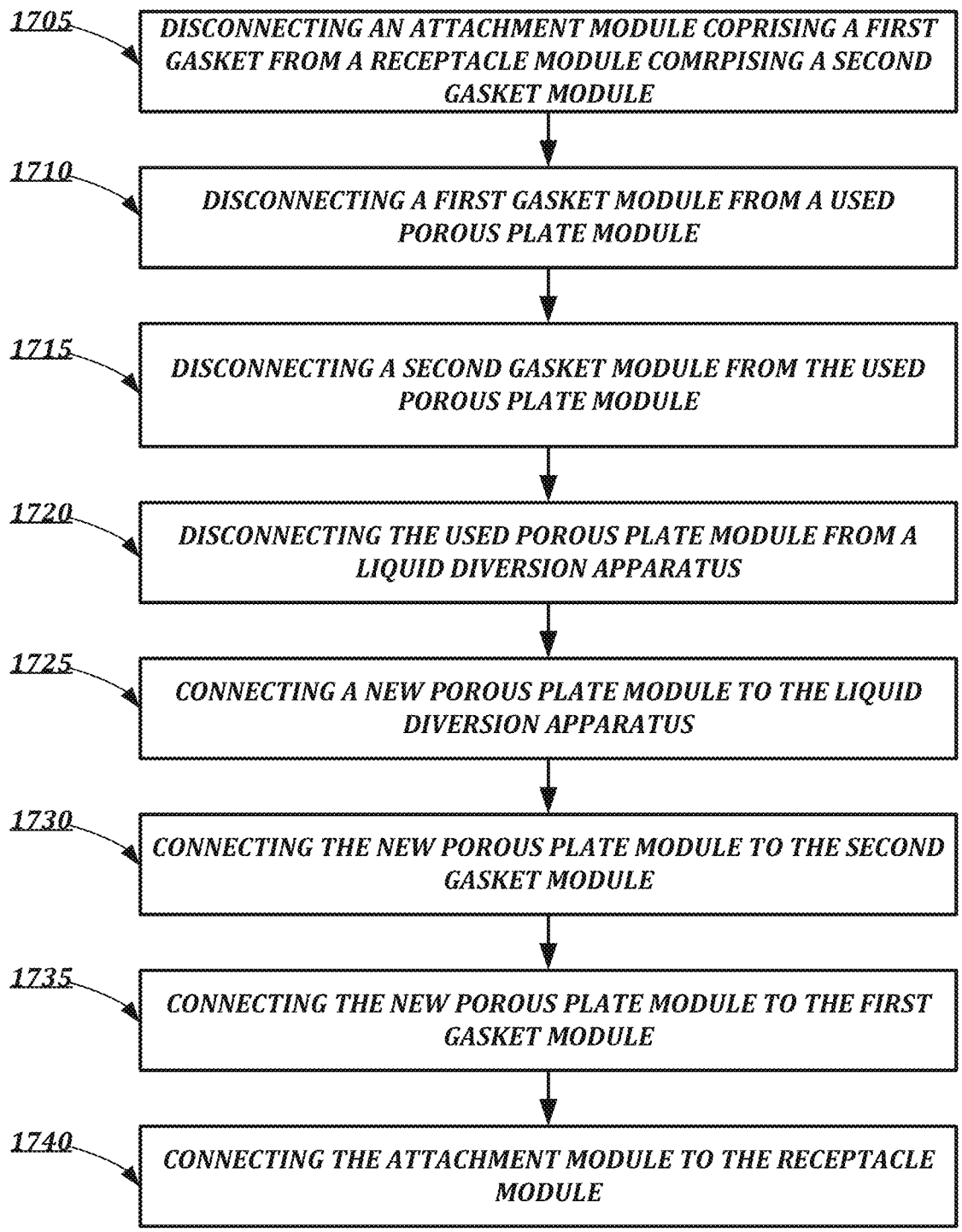
FIG. 17 is a flow chart illustrating a method 1700 replacing the porous plate module 300 in the liquid diversion apparatus 100.
Figure 18:
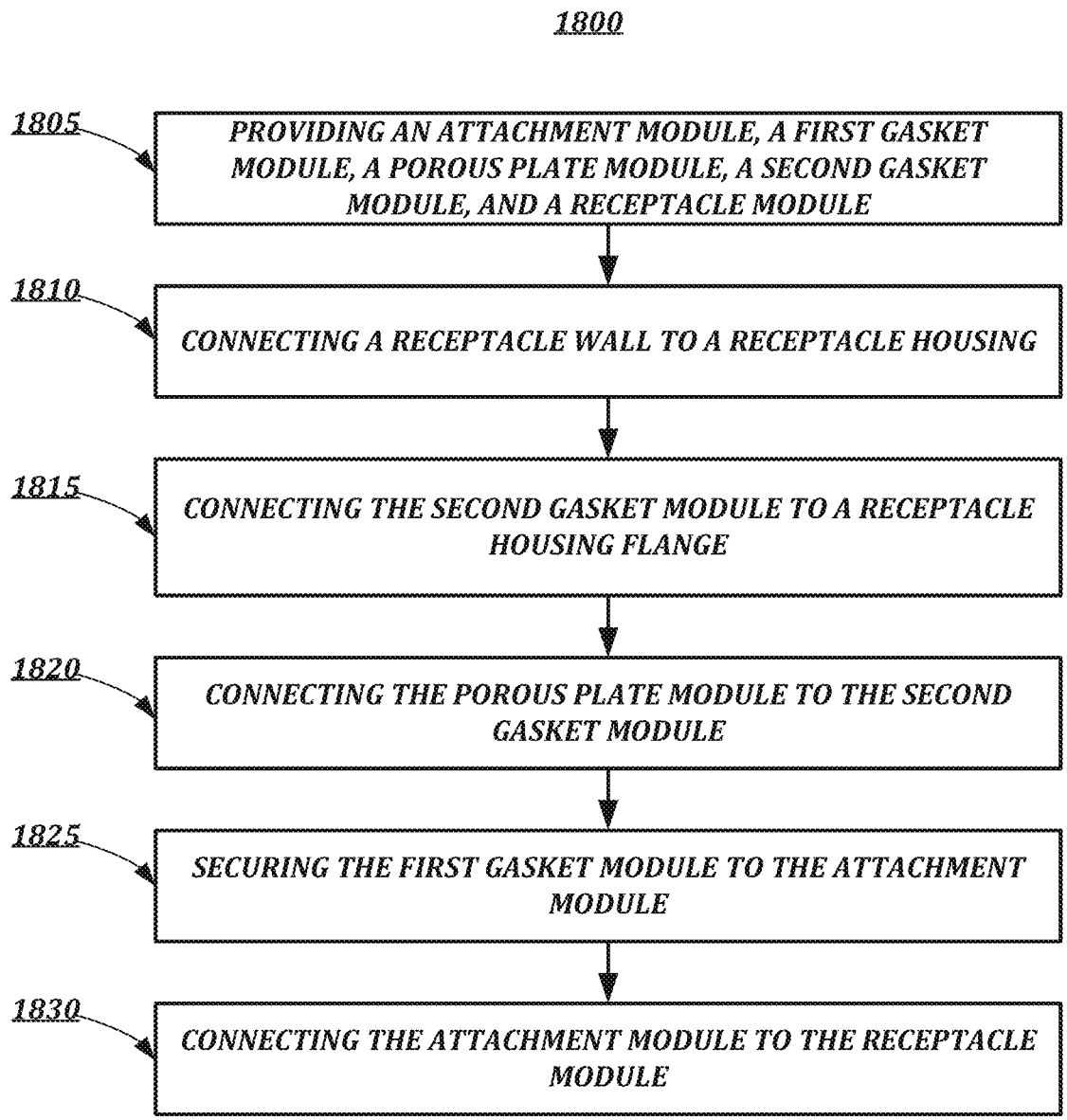
FIG. 18 is a flow chart illustrating a method 1800 for providing the liquid diversion apparatus 100.
Figure 19:
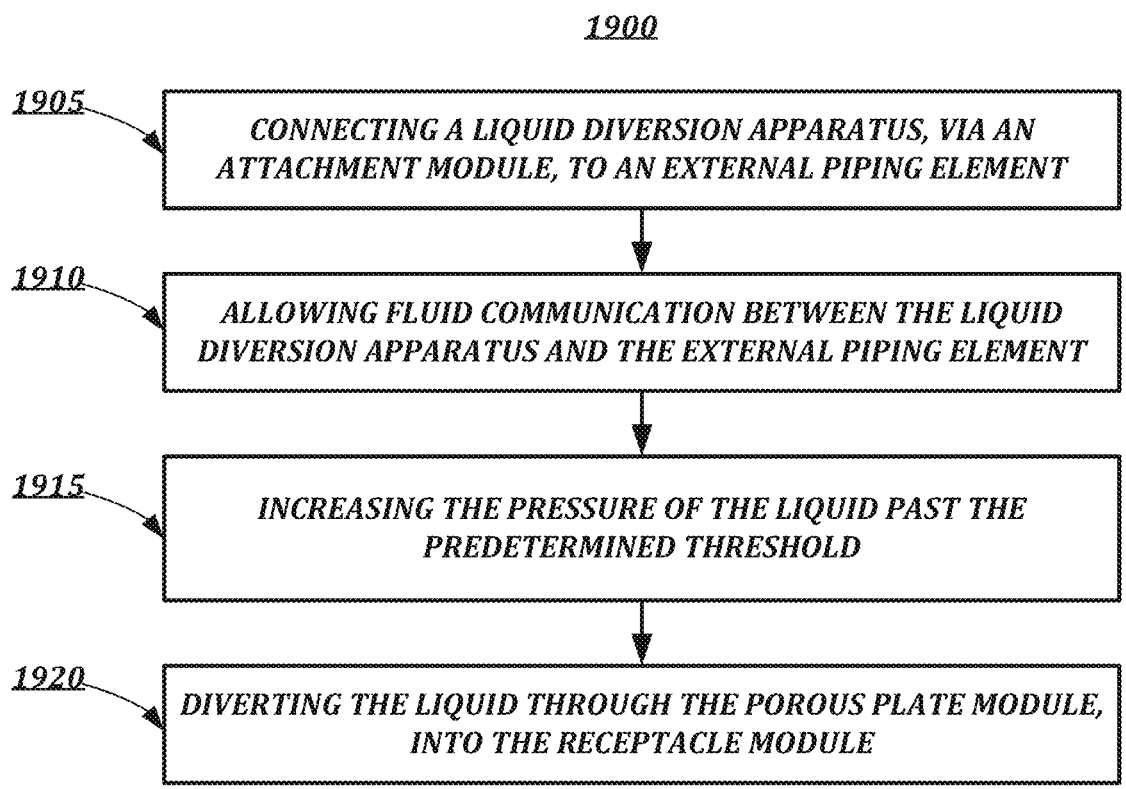
FIG. 19 is a flow chart illustrating a method 1900 for diverting liquid into the liquid diversion apparatus 100.

FIGS. 1, 2, and 10 illustrate possible operating environments through which the liquid diversion apparatus 100 consistent with embodiments of the present disclosure may be provided.

Accordingly, embodiments of the present disclosure provide liquid diversion apparatus 100 comprised of a distributed set of components, including, but not limited to: an attachment module 200; a porous plate module 300; a receptacle module 400; an apparatus securing module 500; and a liquid removal module 600.

FIGS. 1, 2, 3, 5, and 10-14 illustrate the attachment module 200 consistent with an embodiment of the current disclosure.

The attachment module 200 may be provided. In some embodiments, the attachment module 200 may be configured to fit and/or releasably attach to a piping element 700. In some embodiments, piping element 700 may be embodied as, for example, at least one of the following:

a. at least one pipe;
b. a pipe inlet;
c. a T-junction plumbing fixture;
d. a spigot; and
e. various spout configurations.

In yet further embodiments, the attachment module 200 may be configured to direct liquid into the liquid diversion apparatus 100.

In some embodiments, attachment module 200 may comprise an attachment module housing. The attachment module housing may be used to contain the components of the attachment module. In some embodiments, the attachment module housing may comprise an inlet 210. The inlet 210 may be used for directing a liquid into and/or out of the attachment module 200 and on through the remaining modules of liquid diversion apparatus 100.

In some embodiments, liquid diversion apparatus 100 and/or attachment module 200 may comprise a first connecting portion 215. In various aspects, first connecting portion 215 may be used to connect, secure, and/or releasably attach to a tubular element, pipe element, and/or any other element configured to receive or couple with first connecting portion. First connecting portion 215 may be further used to connect to the external piping element 700. First connecting portion 215 may be used to provide a watertight and/or waterproof seal when to connected to, secured to, and/or releasably attached to an external pipe element 700, such as a water supply line, tubular element, pipe element, and/or any other element configured to receive first connecting portion. In further embodiments, first connecting portion 215 may comprise or otherwise take the form of a disc or round plate.

In some embodiments, liquid diversion apparatus 100 and/or attachment module 200 may comprise a second connecting portion 220. Second connecting portion 220 may be used to connect, secure, and/or releasably attach to the receptacle module and/or the housing module. Second connecting portion 220 may be used to provide a water-tight and/or waterproof seal when to connected to, secured to, and/or releasably attached to the receptacle module 400 and/or the porous plate module 300. In further embodiments, second connecting portion 220 may comprise or otherwise take the form of a disc or round plate. In yet further aspects, second connecting portion 220 may be a part of or otherwise integrated with receptacle module 400. In still further aspects, first connecting portion 215 and second connecting portion 220 may be configured to connect with one another, for example, using securing module 500. In some embodiments, first connecting portion 215 and second connecting portion 220 may be configured to have a diameter larger than the diameter of receptacle module 400. In such embodiments, securing module 500 may be located in portions outside the outermost edge of receptacle module 400.

FIG. 1 illustrates the first sealing portion 225 consistent with an embodiment of the current disclosure.

The first sealing portion 225 may be provided. The first sealing portion 225 may be used to secure the porous plate module 300. In some embodiments, the first sealing portion 225 may connect to the porous plate module 300. In further embodiments, the first sealing portion 225 may connect to the attachment module 200. In yet further embodiments the first sealing portion 225 may be housed in the attachment module 200. The first sealing portion 225 may be used to seal, waterproof, secure, and/or enclose, the attachment module 200 when secured to the porous plate module 300 and/or the receptacle module 400.

In some embodiments, the first sealing portion 225 may comprise and/or be embodied as a first gasket module 230. The first gasket module may comprise a gasket and/or a first flange.

FIGS. 2, 5, 7, and 8 illustrate porous plate module 300 consistent with an embodiment of the current disclosure.

The porous plate module 300 may be provided. In some embodiments, the porous plate module 300 may comprise a plurality of filtering portions 305. In further embodiments, the porous plate module may comprise a filter housing 310. The filter housing 310 may be used to contain the plurality of filtering portions. The filter housing 310 may be further used for easy removal and/or replacement from the liquid diversion apparatus 100. In even further embodiments, the porous plate module 300 may be configured to control a flow rate of the liquid flowing from the attachment module 200. In yet further embodiments, the porous plate module 300 may comprise a predetermined threshold to allow liquid to pass through. In even further embodiments, the porous plate module 300 may configured to direct liquid from the attachment module 200, into the receptacle module 400, with or without the liquid reaching a pressure above a predetermined threshold.

It is noted that the porous plate module 300 may comprise any number of filtering portions and/or structural elements made from a plurality of materials, sizes, and/or filtering abilities.

It is further noted that any filtering portion and/or housing disclosed in the porous plate module 300 may connect to any other filtering portion and/or housing in any number of configurations, combinations and/or setups.

In some embodiments, the porous plate module 300 may comprise a first filtering portion 315. In some embodiments, the first filtering portion may connect to a second filtering portion 320. The first filtering portion 315 may be used to protect the integrity of the second filtering portion 320. In some embodiments, the first filtering portion 315 may comprise a plurality of pores and/or apertures. The plurality of pores and/or apertures may be used to allow liquid to pass through the first filtering portion 315. In further embodiments, the first filtering portion 315 may comprise a means to structurally integrate and/or maintain the structural integrity of the second filtering portion 320. In yet further embodiments, the first filtering portion 315 may be configured to connect to the first sealing portion 225. In some embodiments, connecting the first filtering portion 315 to the first sealing portion 225 may create and/or form a liquid-proof seal.

Figure 24:
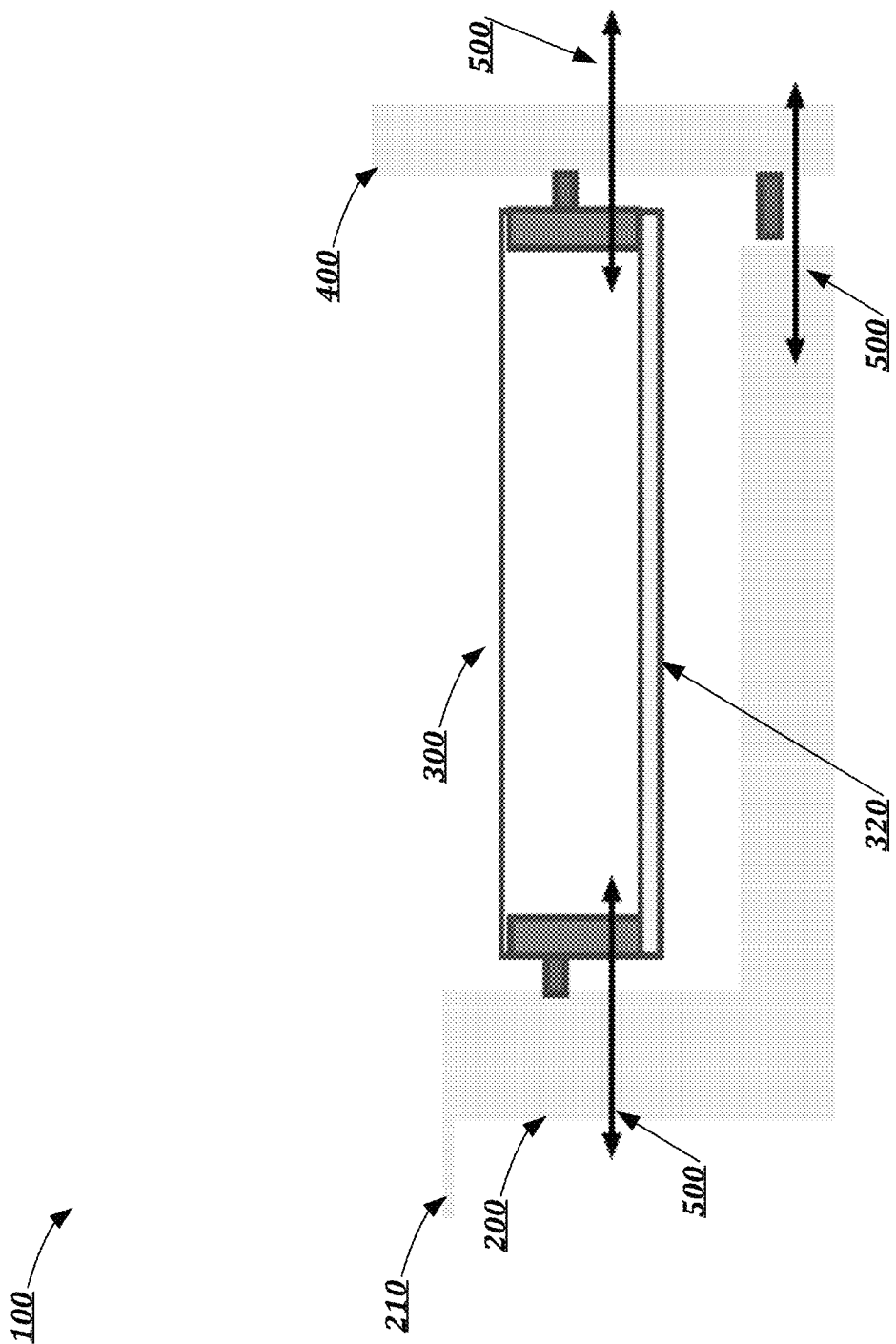
FIG. 24 illustrates an axisymmetric view of an alternative embodiment of a liquid diversion apparatus 100.

The porous plate module 300 may be configured to have some and/or all of the components to be affixed radially and/or axially relative to the attachment module 200, the receptacle module 400, and/or a porous plate housing module 335. In the radial embodiment, the porous plate housing module 335 may be configured to collect and/or act as a receptacle for liquid passing through at least one filtering portion of the porous plate module, as illustrated in an axisymmetric view in FIG. 24. In this embodiment, the porous plate module may be cylindrical.

In some embodiments, the porous plate module 300 may comprise the second filtering portion 320. In some embodiments, the second filtering portion 320 may connect to a third connecting portion 325. In some embodiments, the second filtering portion 320 may comprise a plurality of pores. In some embodiments, the maximum allowed pore size in the membrane may be governed by a material contact angle and a water pressure captured by a Young-Laplace equation such as, for example, $$\Delta p = \frac{4\gamma}{d}\cos\theta.$$

In further embodiments, the second filtering portion 320 may be constructed of and/or comprise a nanoporous hydrophobic membrane. The nanoporous hydrophobic membrane may be used to control liquid in a gated manner. The nanoporous hydrophobic membrane may further be used to allow liquid to pass through the membrane at threshold value between a burst pressure of a pipe and a typical residential or commercial water pressure. In some embodiments, the material of the nanoporous hydrophobic membrane may comprise material that displays a water contact angle of greater than 90 degrees.

In some embodiments, the second filtering portion 320 may be configured to comprise the entirety of the porous plate module. The second filtering portion 320 configured to comprise the entirety of the porous plate module 300 may comprise enough structural integrity for use fully functional use without other components of the porous plate module 300.

In some embodiments, the porous plate module 300 may comprise the third filtering portion 325. In some embodiments, the third filtering portion 325 may connect to the attachment module second connecting portion 220. The third filtering portion 325 may be used to protect the integrity of the second filtering portion 320. In some embodiments, the third filtering portion 325 may comprise a plurality of pores and/or apertures. The plurality of pores and/or apertures may be used to allow liquid to pass through the third filtering portion 325. In further embodiments, the third filtering portion 325 may comprise a means to structurally integrate and/or maintain the structural integrity of the second filtering portion 320.

In some embodiments, connecting the third filtering portion to the first sealing portion may create and/or form a liquid-proof seal.

In some embodiments, the porous plate module 320 may comprise a fourth filtering portion 330. In some embodiments, the fourth filtering portion 330 may connect to a second filtering portion 320, the first filtering portion 315 and/or the third filtering portion 325. The fourth filtering portion 330 may be used to protect the integrity of the second filtering portion 320. In some embodiments, the fourth filtering portion 330 may comprise a plurality of pores and/or apertures. In some embodiments, the plurality of pores and/or apertures may comprise a structure and/or capability different than the first filtering portion 315, the second filtering portion 320, and/or the third filtering portion 325. The plurality of pores and/or apertures may be used to allow liquid to pass through the fourth filtering portion 330. The plurality of pores and/or apertures may be further used to filter the liquid of undesired substances prior to the liquid reaching the remaining components of the porous plate module 330.

In some embodiments, connecting the fourth filtering portion 330 to the first sealing portion 315, second sealing portion 320, the first filtering portion 315, and/or the third filtering portion 330 may create and/or form a liquid-proof seal.

FIGS. 11-14 illustrate the porous plate housing portion 335 consistent with an embodiment of the current disclosure. In some embodiments, the porous plate housing module 335 may be configured to house at least a portion of the porous plate module 300. In further embodiments, the porous pate housing module may comprise a porous plate housing module first end. In some embodiments, the porous plate housing module first end may be configured to connect and/or secure to at least a portion of the attachment module 200. In yet further embodiments, the porous pate housing module 335 may comprise a porous plate housing module second end. In some embodiments, the porous plate housing module second end may be configured to connect and/or secure to at least a portion of the receptacle module 200 and/or an external receptacle housing connecting portion.

In even further embodiments, the porous pate housing module 335 may be configured to prevent leaking of liquid from the apparatus 100 in the event of a failure of some or all of the other portions of the apparatus 100.

FIGS. 1, 2, 4, 5, and 9-14 illustrate receptacle module 400 consistent with an embodiment of the current disclosure.

The receptacle module 400 may be provided. The receptacle module 400 may be used to collect the liquid that flows through the porous plate module 300.

In some embodiments, the receptacle module 400 may be configured to connect and/or secure onto the attachment module 200 and/or the porous plate housing module 335. In some embodiments, connecting the receptacle module 400 to the attachment module 200 and/or porous plate module 300 may create and/or form a liquid-proof seal.

In further embodiments, the receptacle module 400 may comprise a receptacle housing 405. In still further embodiments, the receptacle module 400 may comprise a receptacle wall 410. In yet further embodiments, the receptacle module 400 may comprise a second sealing portion 415.

In some embodiments, the receptacle module 400 may comprise a receptacle housing 405. In some embodiments, the receptacle housing 405 may be used as a container with walls to define an enclosed area. In further embodiments, the receptacle housing 405 may be used to contain the receptacle module 400 components.

In some embodiments, the receptacle housing 405 may comprise the internal receptacle housing. The internal receptacle housing 420 may be used to collect liquid. In some embodiments, the internal receptacle housing 420 may comprise the at least one flange. The at least one flange may be used to secure the second sealing portion 415. The at least one flange may be further used to secure the porous plate module 300. In some embodiments, the at least one flange may be configured as a protrusion, projecting flat rim, collar, and/or rib.

In further embodiments, the housing may comprise the external receptacle housing 425.

In various embodiments, the receptacle housing 405 may comprise a receptacle wall. In some embodiments, the receptacle wall may connect to the receptacle housing 405. In other embodiments, receptacle wall may comprise second connecting portion 220. The receptacle wall may be used as a removable backing to the receptacle module 400. In some embodiments the receptacle wall may be rigid. In some embodiments, the receptacle wall may be manufactured of a flexible or pliant material such as, for illustrative purposes, a natural or synthetic woven or non-woven fabric, a rubber or other flexible polymer material, and/or a silicone-based material. The flexible or pliant material may be used to expand and collect additional liquid than would be allowed for a rigid receptacle wall. In some embodiments the receptacle wall may comprise an aperture. The aperture may be used to connect a tubular device or alternative liquid receptacle to the receptacle wall.

The second sealing portion 415 may be provided. The second sealing portion 415 may be used to secure the porous plate module 300. In some embodiments, the second sealing portion 415 may connect to the porous plate module 300. In further embodiments, the second sealing portion 415 may connect to the attachment module 200. In yet further embodiments the second sealing portion 415 may be housed in the attachment module 200.

The second sealing portion 415 may be used to seal, waterproof, secure, and/or enclose, the receptacle module 400 when secured to the porous plate module 300 and/or the attachment module 200.

In some embodiments, the second sealing portion 415 may comprise, connect to, and/or be embodied as, a second gasket module 425. The second gasket module may comprise a second gasket and/or a second flange.

The second gasket module may be provided. In some embodiments, the second gasket module may comprise a second gasket. In further embodiments, the second gasket module may comprise a securing portion. In yet further embodiments, the second gasket module may connect to at least one flange in an internal receptacle housing of the receptacle module. In still further embodiments, the second gasket module may connect to the porous plate module 300. In even further embodiments, the second gasket module may connect to at least one of the plurality of filtering portions of the porous plate module 300. The second gasket module may be used to secure the porous plate module 300 to the internal receptacle housing 420. The second gasket module may further be used to prevent leaking of liquid passing through the internal receptacle housing 420 and the porous plate module 300.

In some embodiments, a plurality of gasket modules may be provided. The plurality of gasket modules may reside between the first filtering portion, second filtering, portion, and/or the third filtering portion. In some embodiments, receptacle module 400 may comprise a fixed volume space or flexible volume space, for example and without limitation, using an elastic, balloon-like material or a piston-like space that expands in volume. In other embodiments, receptacle module 400 may further contain an absorbent material to soak up the diverted water.

FIGS. 1-3, 4, 5, and 10-14 illustrate the receptacle module 400 consistent with an embodiment of the current disclosure.

The apparatus securing module 500 may be provided. The apparatus securing module 500 may be used to secure various components, modules, and/or parts of the apparatus to one another. In some embodiments, the apparatus securing module 500 may be configured to fit and/or releasably attach on and/or through at least one of the following:

f. the attachment module;
 g. the porous plate module; and
 h. the receptacle module.

In further embodiments, the apparatus securing module 500 may be configured to form a liquid-proof seal for the apparatus 100. In further embodiments, the apparatus securing module 500 may comprise a screw, barrel, and/or thread system. In further embodiments, the apparatus securing module 500 may comprise any other type of releasable attaching means and/or system.

Figure 23:
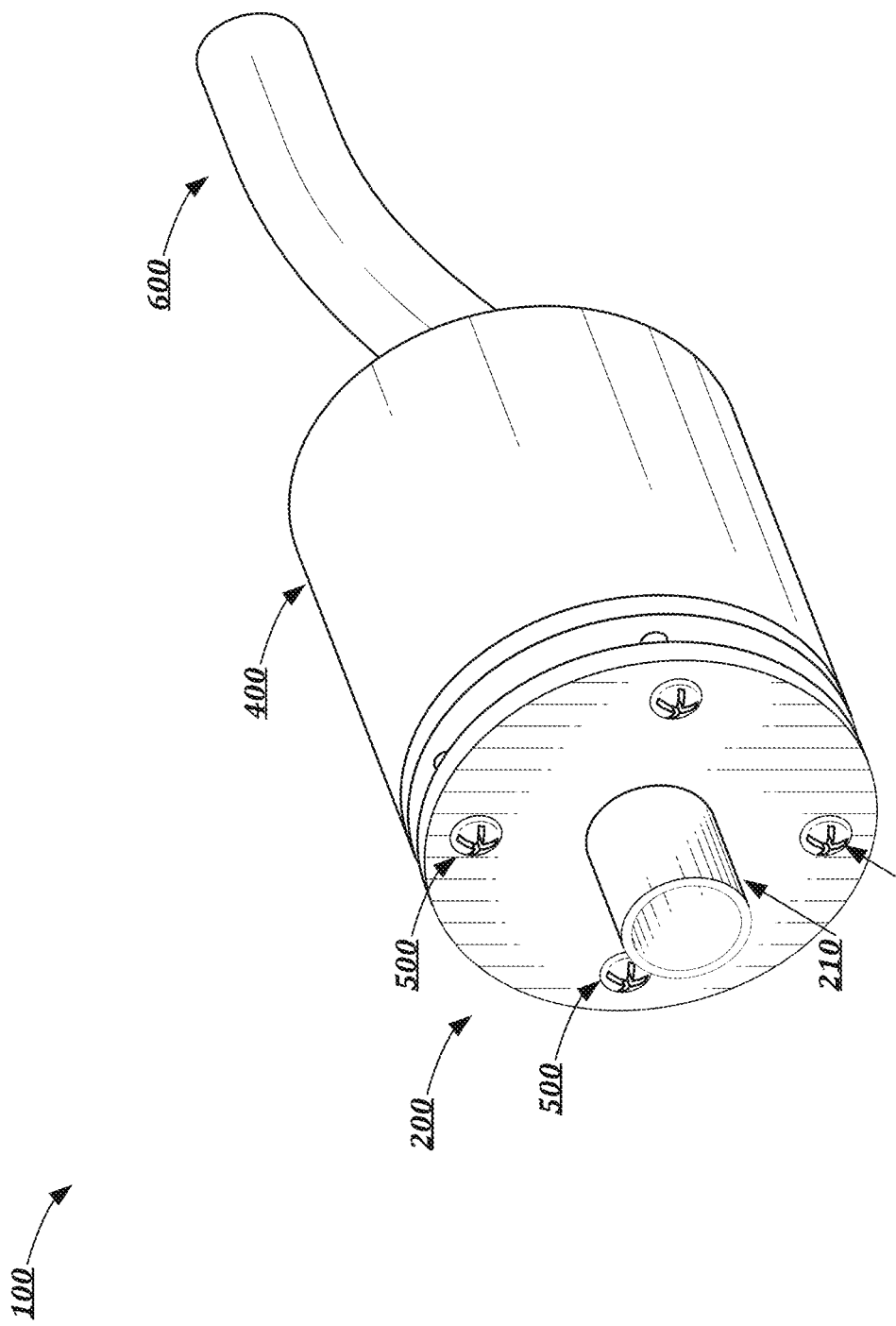
FIG. 23 illustrates a perspective view of an alternative embodiment of a liquid diversion apparatus 100.

FIG. 23 illustrates the liquid removal module 600 consistent with an embodiment of the present disclosure. In some embodiments, the liquid removal module 600 may be configured to fit and/or releasably attach to a plurality of pipes, pipe inlets, T-junction plumbing fixture, spigots, and/or spout configurations. In further embodiments, the liquid removal module 600 may connect to the receptacle module 200. In yet further embodiments, the liquid removal module 600 may be configured to direct liquid out the receptacle module 400 and/or liquid diversion apparatus 100.

III. APPARATUS/SYSTEM USE

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the methods without altering or deterring from the fundamental scope of the depicted methods and systems disclosed herein.

Consistent with embodiments of the present disclosure, a method may be performed by at least one of the aforementioned components. The method may be embodied as, for example, but not limited to, computer instructions, which when executed, perform the method. The method may comprise the following stages:

1. A method 1500 for diverting liquid into a liquid diversion apparatus, the method comprising:
   a. 1505—connecting a liquid diversion apparatus to a liquid directing apparatus;
      i. Variation 1: connecting a liquid diversion apparatus to at least one of the following:
         1. pipes,
         2. pipe inlets,
         3. T-junction plumbing fixture,
         4. spigot, and
         5. spout configuration;
   b. 1510—increasing liquid pressure, wherein the liquid pressure increases to a point that allows movement through a porous plate module,
      i. Variation 1: decreasing the liquid temperature, wherein the liquid pressure increases to a point that allows movement through a porous plate module,
      ii. Variation 2: decreasing liquid temperature leading to a phase change to a solid, wherein the liquid pressure increases to a point that allows movement through a porous plate module,
      iii. wherein the porous plate module comprises a nanoporous hydrophobic membrane;
         1. Optional: wherein the nanoporous hydrophobic membrane allows liquid to pass through the nanoporous hydrophobic membrane at a threshold value between a burst pressure of a pipe and a predetermined water pressure;
   c. 1515—diverting the liquid through the porous plate module; and
   d. 1520—collecting the liquid in a receptacle module,
      i. Variation 1: collecting the liquid in a container connected to a receptacle module.
2. A method 1600 for providing a porous plate module, the method comprising:
   a. 1605—providing a first layer of a porous plate module;
   b. 1610—providing a second layer of a porous plate module,
      i. wherein the second layer of the porous plate module comprises a nanoporous hydrophobic membrane,
      ii. wherein the second layer of the porous plate module connects to the first layer of the porous plate module;
   c. 1615—providing a third layer of porous plate module,
      i. wherein the third layer of the porous plate module connects to the second layer of the porous plate module;
   d. Optional: stacking the plurality of layers;
   e. 1620—connecting the edges of the plurality of layers,
      i. Optional: wherein connecting the edges of the plurality of layers comprises at least one of the following:
         1. fusing,
         2. adhering,
         3. brazing,
         4. soldering,
         5. welding,
         6. spot weld,
         7. screw with nut,
         8. riveting,
         9. fitting,
         10. threading,
         11. friction fit,
         12. snap-fit,
         13. compression fit; and
      i. Optional: wherein connecting the edges of the plurality of layers comprises fitting a plurality of gaskets between any number of the plurality of layers,
   f. 1625—connecting the plurality of layers to a housing of a liquid diversion apparatus.
3. A method 1700 for replacing a porous plate module in a liquid diversion apparatus, the method comprising:
   a. Optional: Providing a liquid diversion apparatus;
   b. Optional: disconnecting an attachment module from a liquid directing module;
   c. Optional: orienting the liquid diversion apparatus such that a receptacle module is vertically lower than an attachment module;
   d. 1705—disconnecting an attachment module comprising a first gasket from a receptacle module comprising a second gasket;
      i. Variation 1: disconnecting a receptacle module from an attachment module,
   e. 1710—disconnecting the first gasket module from a used porous plate module;
      i. Variation 1: disconnecting a porous plate module from the first gasket module,
   f. 1715—disconnecting a second gasket module from the used porous plate module;
   g. 1720—disconnecting the used porous plate module from a liquid diversion apparatus;
   h. Optional: Removing a collected liquid in the receptacle module;
   i. 1725—connecting a new porous plate module to the liquid diversion apparatus;
   j. 1730—connecting the new porous plate module to the second gasket module;
   k. 1735—connecting the new porous plate module to the first gasket module; and
   l. 1740—connecting the attachment module to the receptacle module.
4. A method 1800 for providing a liquid diversion apparatus, the method comprising:
   a. 1805—providing an attachment module, a first gasket module, a porous plate module, a second gasket module, and a receptacle module;
   b. 1810—connecting a receptacle wall to a receptacle housing;
   c. 1815—connecting the second gasket module to a receptacle housing flange;
   d. 1820—connecting the porous plate module to the second gasket module,
      i. wherein the second gasket module is located between the receptacle housing flange and the porous plate module;

e. 1825—securing the first gasket module to the attachment module; and
f. 1830—connecting the attachment module to the receptacle module,
   i. wherein the attachment module and receptacle module are connected by a first securing portion,
g. wherein the second gasket module connects to the porous plate module.

5. A method 1900 for diverting liquid into a liquid diversion apparatus, the method comprising:
   a. 1905—connecting a liquid diversion apparatus, via an attachment module, to an external piping element, the liquid diversion apparatus comprising:
      i. the attachment module,
      ii. a porous plate module configured to direct liquid from the attachment module, into the receptacle module, upon the liquid reaching a pressure above a predetermined threshold, the porous plate module comprising a nanoporous hydrophobic membrane, and
      iii. a receptacle module;
   b. 1910—allowing fluid communication between the liquid diversion apparatus and the external piping element;
   c. 1915—increasing the pressure of the liquid past the predetermined threshold; and
   d. 1920—diverting the liquid through the porous plate module, into the receptacle module.

Although the methods and stages are disclosed in a particular order, it should be understood that the order is disclosed for illustrative purposes only. Stages and/or methods may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. ASPECTS

Figure 20:
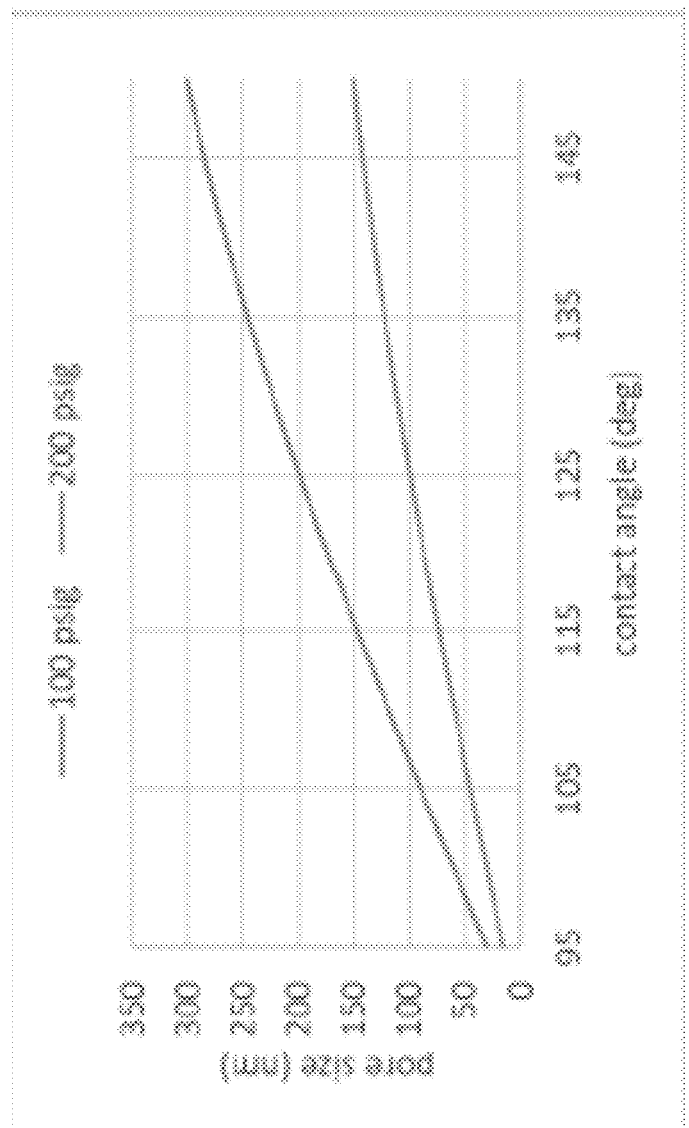
FIG. 20 is a table illustrating a maximum pore size allowed for the nanoporous hydrophobic membrane as a function of the contact angle of water on the membrane material for two different desired threshold pressure values.
Figure 21:
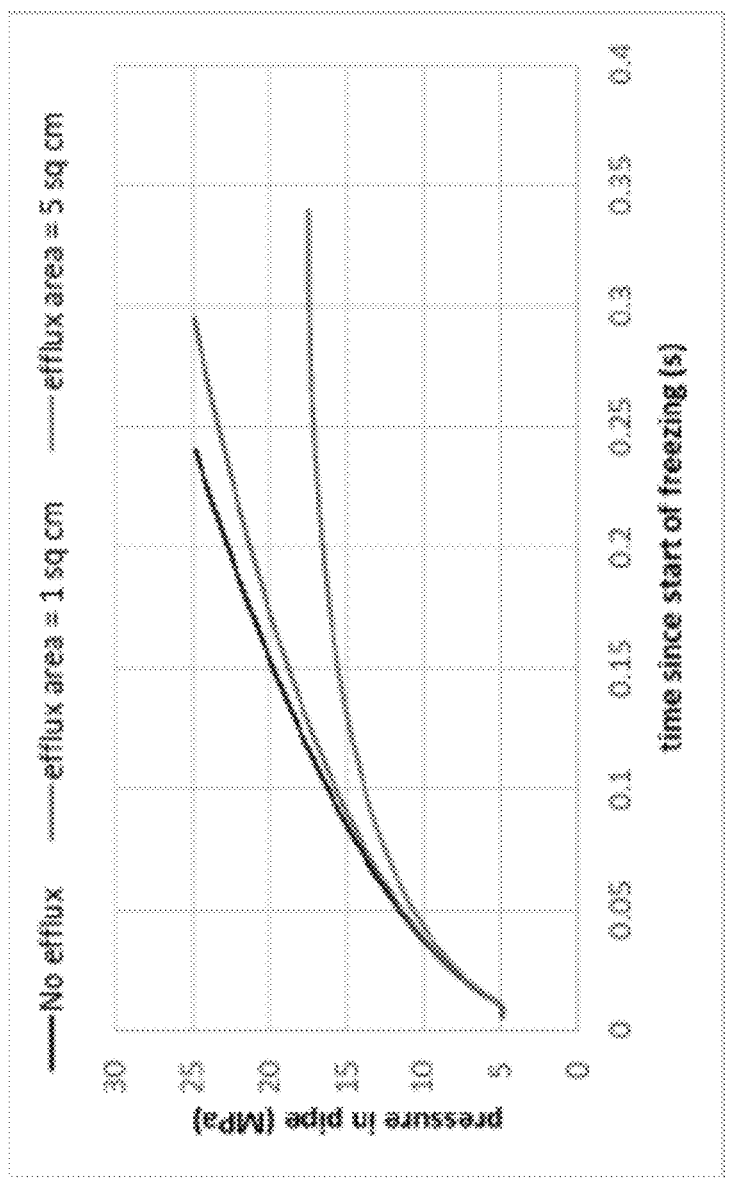
FIG. 21 is a table illustrating numerically calculated pressure inside a ⅜ in Type K copper pipe as a function of time for three different cases with no efflux allowed.
Figure 22:
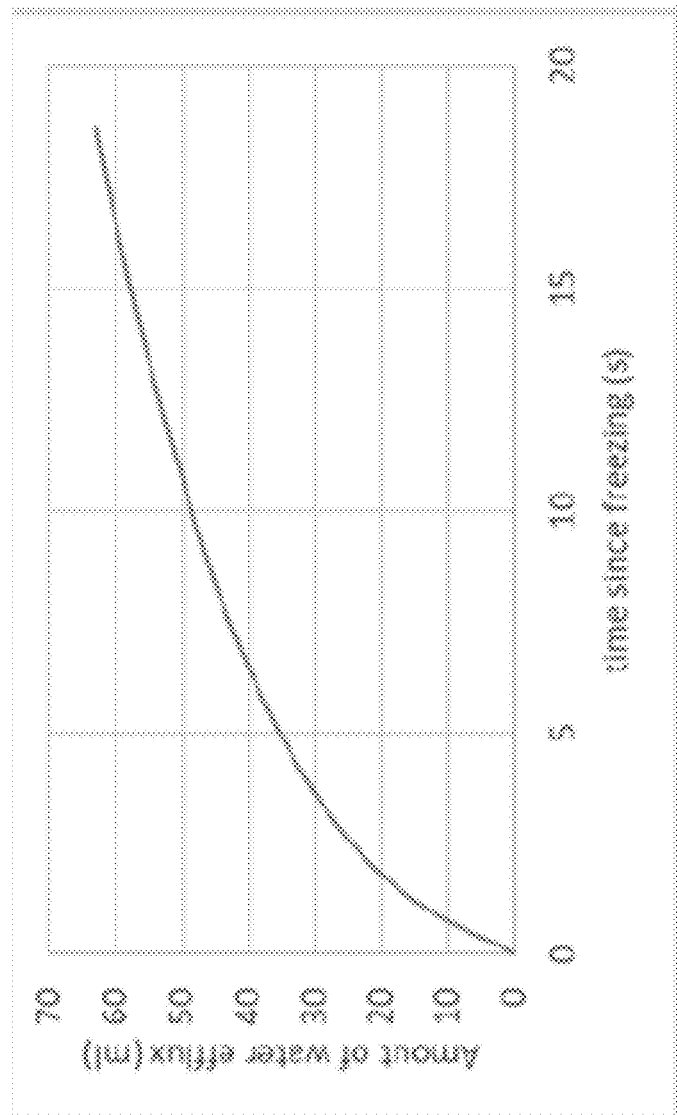
FIG. 22 is a table illustrating an amount of water expelled from the pipe through a 5 sq cm membrane for the apparatus illustrated in FIG. 10.

The following disclose various Aspects of the present disclosure. The various Aspects are not to be construed as patent claims unless the language of the Aspect appears as a patent claim. The Aspects describe various non-limiting embodiments of the present disclosure. FIGS. 20-22 are described in accordance with the Aspects below.

Aspect 1. The invention is a device that prevents bursting of pipes as they freeze during cold weather by utilizing a nanoporous hydrophobic membrane that allows water flow out of the pipe when the water pressure in the pipe reaches a threshold value that is somewhere between the burst pressure of the pipe and the typical home water pressure. The device uses a nanoporous hydrophobic membrane to regulate water flow in a gated manner out of the pipe when the water in the pipe starts to freeze and the water pressure reaches that threshold value. Further, there is no leakage of water from the pipe until that threshold pressure is reached. This device is in form of a removable cartridge that attaches easily to standard home plumbing fixtures and/or can be incorporated with standard faucet fixtures.

Aspect 2. The invention is novel in two ways. First, it uses a nanoporous hydrophobic membrane with pore in a gated fashion to release water pressure from a pipe if and only if the water pressure exceeds a threshold value that is higher than the typical home water pressure and lower than the pipe burst pressure. Second, the overall device is designed to be connected in a modular manner to existing standard plumbing fixtures.

Aspect 3. FIG. 2 shows a (schematic) drawing of the cartridge with the individual parts highlighted. The dimensions and aspect ratios are not to scale. The attachment (A) connects with the outlet from the valve that does not connect to the faucet via the flexible water connector. This attachment can be through a thread-based mechanism such as the one that connects the other valve outlet to the flexible water connector. The attachment is screwed on to the backer and/or receptacle module 400. The backer and/or receptacle module has a raised flange against with the porous plate-nanoporous hydrophobic membrane sandwich (porous plate module 300) rests. This sandwich is kept in place by a securing means (or any other combination of screw, barrel, and thread system) that presses against the attachment. The only function of the spring is to keep the sandwich in place and flush against the flange in the backer. The filtering portions 315 and 325 do not offer significant resistance to flow of water and mainly support/protect the nanoporous hydrophobic membrane. These supports can be made of ceramic, polymer, or metallic materials. Further, there can be a gasket (not depicted) between the porous plate module and the receptacle module. The "leaked" water collects region between the backer wall and support material E. The backer wall may be fixed volume space or flexible volume space with an elastic, balloon-like material or a piston-like space that expands in volume. Additionally, the space between the backer wall and material E may include absorbent material to soak up the leaked water.

Aspect 4. FIG. 10 illustrates an embodiment of how the device attaches to plumbing fixtures. The water line, (or lines, if both hot- and cold-water lines are present) are connected to the flexible line to the faucet via a T-junction that has an opening. The device of this invention (and described in FIG. 1 above) is threaded onto this opening. In most plumbing fixtures, this T-junction is not present, however, attaching this T-junction to existing plumbing fixtures is straightforward. Instead of near the water supply A, the device of this invention can also be attached by the faucet(s) or any other junction in the home water plumbing by similar plumbing mechanisms.

Aspect 5. FIG. 20 shows the maximum pore size allowed for the nanoporous hydrophobic membrane as a function of the contact angle of water on the membrane material for two different desired threshold pressure values. The maximum pore size is calculated from the Young-Laplace Equation: $d_p = 4\gamma \cos\theta/p_t$ (where $\gamma$ is the surface tension, $\theta$ is the contact angle, and pt is the threshold pressure). In the figure, the surface tension is set at 60 mM/m-corresponding to typical hot water. For cold water, the surface tension is somewhat higher (~ 70 mN/m). For example, if the nanoporous membrane is made of PTFE (Teflon) with a contact angle value of 110 degrees and threshold pressure of 100 psi, the maximum allowed pore size is 119 nm. Conversely, such a membrane will not leak unless the pressure in the pipe has reached 100 psi.

Aspect 6. FIG. 21 shows numerically calculated (using the mathematical model discussed in the appendix) pressure inside a ⅜ in Type K copper pipe as a function of time for three different cases-no efflux allowed (i.e., no cartridge attachment-most existing plumbing systems) (black line), with efflux allowed using nanoporous hydrophobic PTFE membranes of cross-sectional area 1 sq cm (blue line), and with efflux allowed using nanoporous hydrophobic PTFE membranes of cross sectional area 5 sq cm (red line). In the above cases, it is assumed that 10% of the pipe length is exposed to outside air at −40° C. Typical burst pressure of annealed copper pipe of 3/8 in copper pipe is ~25 MPa. Accordingly, such a pipe will eventually burst with no efflux, as well as with a smaller nanoporous hydrophobic membrane. On the other hand, with a suitably chosen membrane size, the pressure inside the pipe will not reach burst pressure (red line).

Aspect 7. FIG. 22 shows the amount of water expelled from the pipe through the 5 sq cm membrane for the system shown in FIG. 4. The total volumetric efflux for the case that prevents water from bursting is 63 ml. After that amount of water is ejected from the pipe through the membrane, the pressure in the pipe drops below the threshold pressure of the membrane. Accordingly, a reasonably small open-space volume is required between the membrane and the backer (see FIG. 1) to prevent pipe burst. The exact size required for a given application can be computed mathematically from the procedure shown in the appendix.

Aspect 8. In the following, the mechanism of action of the invention is described in detail. To avoid bursting of a pipe, two criteria must be met. First, there should be a mechanism to allow for water release when the pressure in the pipe exceeds a specified value (greater than the typical water pressure in household plumbing) and to prevent continuous leakage water release should only occur when the pressure in the pipe exceeds that specified value. Second, the mechanism should allow for a high enough water release rate such that the pressure in the pipe does not exceed the burst pressure of the pipe.

Aspect 9. Mechanism for Water Release

The nanoporous hydrophobic membrane, NPH, is the "active" component of the invention and provides the required mechanism for water release. The material of the membrane is any hydrophobic material that displays a water contact angle (at the operating temperature) of greater than 90 degrees. The maximum allowed pore size in the membrane is governed by the material contact angle and the water pressure, and the physics that governs that is captured by Young-Laplace equation:

$$\Delta p = \frac{4\gamma}{d} \cos \theta.$$

Aspect 10. In the above equation, the pressure drop (on the left side) is the difference between the water pressure in the pipe and the air pressure in the cartridge (atmospheric). $\gamma$ is the surface tension of water-air interface, d is the pore diameter (or, size), and $\theta$ is the contact angle of water on the material from which NPH is constructed. If the pressure drop is below that governed by the above equation, the pore of diameter d will not allow water entry.

Aspect 11. To determine the applicable pore size, the following limits on the pressure drop (or, the difference in water pressure and air pressure) must be enforced. The pore size should not be so small such that the water pressure in the pipe increases above the pipe burst pressure. On the other hand, the pore size should be small enough such that water invades the pores (and, thus, releases pressure in the pipe) only at water pressures significantly above the normal water pressures in pipes. Otherwise, the cartridge will continually leak.

Aspect 12. For example, on polytetrafluoroethylene (PTFE), the contact angle of water is approximately 110 degrees. Typical home water pressure is in the range 40-80 psig. Assuming a water surface tension of 60 mN/m at the operating temperature of a hot-water pipe, and a release pressure of 200 psig, the maximum allowed size of the pores in the NPH is 59.5 nm. In other words, a membrane made of PTFE with a maximum pore size of 59.5 nm will release water when the pressure in the pipe exceeds 200 psig. Once the excess water pressure is released, the pressure inside the pipe will fall below the capillary pore entry pressure given by the equation above and the water will no longer flow through the NPH. In general, the relationship between the maximum pore size and the contact angle of the membrane material with water is governed by the equation of Aspect 10. The allowed maximum pore size for hydrophobic materials with different contact angles is given in FIG. 20.

Aspect 13. Required Water Release Rate

Presently, the mechanism that allows for a water release rate to prevent the buildup of pressure in the pipe is discussed. This objective is achieved by estimating a safe release rate typical operating conditions and evaluating whether commercially available NPH membranes allow that.

As water in a section of the pipe freezes, the pressure throughout the pipe increases. Depending on the system details, such an increase in pressure may eventually lead to a pressure that exceeds the pipe burst pressure. On the other hand, if some of the water is allowed to "leak" when the pressure exceeds a threshold value (i.e., the NPH membrane leakage pressure), the pressure in the pipe may remain below the pipe burst pressure. Below, the numerical procedure to estimate the pressure in the pipe is described.

The physical picture of the overall phenomena is described below. A segment of the pipe of length $L_0$ is exposed to the outside temperate Ta, whereas the rest of the pipe is not exposed (e.g., is insulated). The water in the pipe cools down to the freezing point of water, and the phase change to ice subsequently starts in that exposed segment. An assumption in the following development is that the frozen section grows radially inward and not axially. A schematic of the radial growth of ice in a pipe of outer radius $R_3$ and inner radius $R_2$ may be provided. The radius of the water region is $R_1$. As water freezes, $R_1$ decreases.

In absence of any convective flow (e.g., the water faucet is turned off), the heat loss is through conduction. Across any material (metal pipe or ice), the heat equation is given by (assuming water is at 0° C. throughout):

$$\rho C p = \frac{\partial T}{\partial t} = \frac{k}{r} \frac{\partial}{\partial r} \left( r \frac{\partial T}{\partial r} \right) \qquad (2)$$

Aspect 14. In Eq. 2, $\rho$ is the density of the material, Cp is its specific heat, and k is the thermal conductivity. In general, the temperature profile in each material is governed by Eq. 2 and its own material properties. Once the ice starts to form, the differences in material properties allow a simplification: the ratio of $\rho Cp/k$ of copper and ice is approximately 0.01. Thus, the resistance to overall heat flux is dominated by the flux through ice after a small amount of ice forms. Consequently, solving Eq. 2 only for ice and using the outside temperature as a boundary condition for the ice annulus is reasonable:

$T=T_0$ at $r=R_1(t)$ $T=T_a$ at $r=R_2$

Aspect 15. Using the standard technique of subtracting out the steady state temperature corresponding a specific value of $R_1$ and a separation of variables, the temperature distribution can be given (for that specific $R_1$) by:

$$T = \frac{T_0 - T_a}{\ln\left(\frac{R_1}{R_2}\right)} r + T_a - \frac{T_0 - T_a}{\ln\left(\frac{R_1}{R_2}\right)} \ln(R_2) + \sum_{m=1}^{\infty} A_m e^{-\lambda_m^2 t/\rho C_p} \left[ Y_0(\lambda_m r) - \frac{Y_0(\lambda_m R_2)}{J_0(\lambda_m R_2)} J_0(\lambda_m r) \right] \quad (4)$$

Aspect 16. In Eq. 4, $J_0$ and $Y_0$ are zeroth-order Bessel functions of first and second kinds, respectively, and $\lambda_m$ are the eigenvalues given by:

$$J_0(\lambda_m R_1) Y_0(\lambda_m R_2) = J_0(\lambda_m R_2) Y_0(\lambda_m R_1) \quad (5)$$

Aspect 17. The solution for the temperature profile allows the determination of the heat flux at the water-ice interface: this heat loss equals the heat loss by the annulus of water that freezes in time $\Delta t$. In other words, if the specific latent heat of fusion of water is $\Delta Hv$, then $$\int_0^{\Delta \tau} 2\pi k R_{1,old} \frac{\partial T}{\partial r}\bigg|_{r=R_{1,old}} dt = \Delta H_v \cdot 2\pi (R_{1,old}^2 - R_{1,new}^2) \rho_{ice} \quad (6)$$

Aspect 18. Eq. 6 is solved for each $\Delta t$ time interval, and a new water radius is obtained. As the volume occupied by ice is larger than the volume occupied by the same mass of water, the pressure in the pipe increases as water freezes. Such an increase in water pressure can be estimated (as discussed below) from the bulk compressibility equation:

$$dp = -\beta d \ln V \quad (7)$$

Aspect 19. In Eq. 7, $\beta$ is the bulk compressibility of water.

The increase in pressure is estimated from Eq. 7 as follows: as water freezes, the remaining water must "fit" into the reduced space (not occupied by ice). In other words, the change in pressure due to the compressed water is due to the difference between the volume occupied by (to be) displaced water before and after the formation of new ice. Integrating Eq. 7 leads to estimating the new pressure (if no water leaks):

$$p' = p_{old} + \beta \ln\left[\frac{R_2^2(L-L0) + R_{1,new}^2 L0}{R_2^2(L-L0) + R_{1,old}^2 L0}\right] \quad (8)$$

Aspect 20. Typically, efflux through a membrane is reported in the units of volumetric flow per unit area per unit time for a specified pressure drop (say, $\Delta p_{ref}$). Accordingly, if the pressure difference between the increased pipe pressure p' and the atmospheric pressure is denoted by $\Delta p$, the volumetric efflux is given by:

$$Vefflux = q_{m,ref}\left(\frac{\Delta p}{\Delta p_{ref}}\right) A \Delta t \quad (9)$$

Aspect 21. When the above amount of water leaks, the pressure in the pipe drops. Again, Eq. 7 can be used to estimate the new pressure. Essentially, after the efflux, the remaining amount of water "expands" to fill up the pipe. The new pressure is given by:

$$p = p' + \beta \ln\left[\frac{R_2^2(L-L0) + R_{1,new}^2}{R_2^2(L-L0) + R_{1,new}^2 L0 - V_{efflux}}\right] \quad (10)$$

Aspect 22. Equations. 8 and 10 assume that the bulk compressibility of water remains constant for the range of pressures encountered.

Aspect 23. Eventually, the pipe pressure given by Eq. 10 evaluated as a function of time with the aim of choosing the membrane material and dimensions (characterized by Eq. 9) such that the pressure remains safely below the pipe burst pressure. FIGS. 21 and 22 show results obtained from this procedure and show the feasibility of the invention under moderately extreme freezing conditions.

A method for providing a porous plate module, the method comprising:
  providing a first layer of a porous plate module;
  providing a second layer of a porous plate module,
    wherein the second layer of the porous plate module comprises a nanoporous hydrophobic membrane,
    wherein the second layer of the porous plate module connects to the first layer of the porous plate module;
  providing a third layer of porous plate module,
    wherein the third layer of the porous plate module connects to the second layer of the porous plate module;
  connecting the edges of the plurality of layers together; and
  connecting the plurality of layers to a housing of a liquid diversion apparatus.

Aspect 24. A method for providing a liquid diversion apparatus, the method comprising:
  providing an attachment module, a tension portion, a porous plate module, a gasket module, and a receptacle module;
  connecting a receptacle wall to a receptacle housing;
  connecting the gasket module to a receptacle housing flange;
  connecting the porous plate module to the gasket module,
    wherein the gasket module is located between the receptacle housing flange and the porous plate module;
  securing the tension portion to the attachment module; and
  connecting the attachment module to the receptacle module,
    wherein the attachment module and receptacle module are connected by a first securing portion,
  wherein the tension portion connects to the porous plate module.

Aspect 25. A method for replacing a porous plate module in a liquid diversion apparatus, the method comprising:
  disconnecting an attachment module from a receptacle module;
  disconnecting a gasket module from a used porous plate module;
  disconnecting a tension portion from the used porous plate module;
  disconnecting the used porous plate module from a liquid diversion apparatus;
  connecting a new porous plate module to the liquid diversion apparatus;
  connecting the new porous plate module to the tension portion;
  connecting the new porous plate module to the gasket module; and connecting the attachment module to the receptacle module.

Aspect 26. The apparatus of any preceding aspect, wherein the receptacle module comprises a second gasket configured to secure the second sealing portion.

Aspect 27. The apparatus and/or nanoporous hydrophobic membrane may be operative for, wherein the predetermined threshold comprises a liquid pressure greater than a non-freezing psi (pounds per square inch) and less than a liquid pressure effective to burst the external piping element.

Aspect 28. The apparatus and/or nanoporous hydrophobic membrane may be operative for, wherein the predetermined threshold comprises a liquid pressure greater than 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, and/or 80 psi.

Aspect 29. The apparatus of any preceding aspect, wherein the predetermined threshold comprises a liquid pressure greater than 40 psi (pounds per square inch) and less than a liquid pressure effective to burst the external piping element.

Aspect 30. The apparatus of any preceding aspect, wherein the predetermined threshold comprises a liquid pressure greater than the liquid pressure of the external piping element, and less than a burst pressure of the external piping element.

Aspect 31. The apparatus of any preceding aspect, wherein the predetermined threshold comprises a liquid pressure greater than the liquid pressure of a standard household (US), and less than a burst pressure of the external piping element.

V. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A liquid diversion apparatus configured to divert water, the apparatus comprising:
    a porous plate module comprising a filtering portion that includes a nanoporous hydrophobic membrane;
    a receptacle module configured to collect liquid diverted by the membrane;
    an attachment module comprising:
        a first connecting portion configured to connect to a portion of an external piping element, and
        a second connecting portion configured to connect to the receptacle module;
    a first sealing portion configured to seal a first side of the porous plate module and the attachment module; and
    a second sealing portion configured to seal a second side of the porous plate module and the second connecting portion;
    wherein the receptacle module is configured to be in fluid communication with the attachment module for collecting liquid diverted through the porous plate module;
    wherein the nanoporous hydrophobic membrane allows water to pass through the membrane when pressure at the membrane exceeds a threshold value of the membrane.

2. The apparatus of claim 1, wherein the receptacle module comprises:
    an internal receptacle housing configured to house the second sealing portion,
    an external receptacle housing, and
    wherein the second connecting portion comprises a receptacle wall, the receptacle wall configured to connect to the receptacle housing.

3. The apparatus of claim 1, wherein the attachment module comprises a first gasket configured to secure the first sealing portion.

4. The apparatus of claim 1, wherein the porous plate module comprises a porous plate module housing configured to house the filtering portion.

5. The apparatus of claim 1, wherein the first sealing portion is configured to form a liquid-proof seal between the receptacle module and the porous plate module.

6. The apparatus of claim 1, wherein the second sealing portion is configured to form a liquid-proof seal between the attachment module and the porous plate module.

7. The apparatus of claim 1, wherein the threshold value at the membrane comprises a water pressure greater than 40 psi (pounds per square inch) and less than a water pressure effective to burst one or more of: the external piping element, the porous plate module, or the filtering portion.

8. The apparatus of claim 1, wherein the porous plate module forms a hollow cylindrical shape comprising a hollow portion, the hollow portion configured to receive the liquid from the receptacle module,
    wherein, upon the liquid reaching a pressure above the threshold value, the porous plate module is configured to allow the liquid to pass through the filtering portion.

9. The apparatus of claim 1, wherein the nanoporous hydrophobic membrane diverts liquid in a gated manner.

10. The apparatus of claim 1, wherein a pore size of pores within the nanoporous hydrophobic membrane is selected based on a material contact angle and a water pressure.

11. The apparatus of claim 1, wherein a water contact angle of the nanoporous hydrophobic membrane material is greater than 90 degrees, and wherein a maximum pore size of pores in the nanoporous hydrophobic membrane is selected based on quantitative pore diameter and water entry pressure relationships and the threshold value.

12. The apparatus of claim 9, wherein the nanoporous hydrophobic membrane is formed from polytetrafluoroethylene (PTFE), and the maximum pore size is approximately 59.5 nm.

13. The apparatus of claim 1, wherein the nanoporous hydrophobic membrane is configured to prevent flow of liquid into the receptacle when the water pressure at the membrane is below the threshold value.

14. The apparatus of claim 1, wherein the porous plate module further comprises a second filtering portion configured to connect to the filtering portion of the porous plate module and to filter particulates comprised in the liquid as the liquid is directed through the porous plate module.

15. A liquid diversion apparatus configured to divert water, the apparatus comprising:

a porous plate module comprising a filtering portion including a nanoporous hydrophobic membrane configured to divert water by allowing water from an external piping element through the membrane when pressure at the membrane exceeds a threshold value of the membrane;

a receptacle module configured to collect liquid diverted by the membrane;

a first connecting portion configured to connect to a portion of the external piping element;

a second connecting portion configured to connect to the receptacle module;

a first sealing portion configured to seal a first side of the porous plate module and the first connecting portion; and a second sealing portion configured to seal a second side of the porous plate module and the second connecting portion;

wherein the receptacle module is configured to be in fluid communication with the first connecting portion for collecting liquid diverted through the porous plate module.

16. The apparatus of claim 15, wherein the porous plate module further comprises a second filtering portion configured to connect to the filtering portion of the porous plate module and to filter particulates comprised in the liquid as the liquid is directed through the porous plate module.

17. The apparatus of claim 15, wherein the nanoporous hydrophobic membrane diverts liquid in a gated manner.

18. The apparatus of claim 15, wherein a pore size of pores within the nanoporous hydrophobic membrane is selected based on a material contact angle and a water pressure.

19. The apparatus of claim 15, wherein a water contact angle of the nanoporous hydrophobic membrane material is greater than 90 degrees, and wherein a maximum pore size of pores in the nanoporous hydrophobic membrane is selected based on quantitative pore diameter and water entry pressure relationships and the threshold value.

20. The apparatus of claim 15, wherein the nanoporous hydrophobic membrane is formed from polytetrafluoroethylene (PTFE), and the maximum pore size is approximately 59.5 nm.

* * * * *